(12) United States Patent
Rich

(10) Patent No.: US 9,225,580 B2
(45) Date of Patent: Dec. 29, 2015

(54) MECHANISM FOR FACILITATING USER-CONTROLLED FEATURES RELATING TO MEDIA CONTENT IN MULTIPLE ONLINE MEDIA COMMUNITIES AND NETWORKS

(71) Applicant: Bradly Freeman Rich, Paradise Valley, AZ (US)

(72) Inventor: Bradly Freeman Rich, Paradise Valley, AZ (US)

( * ) Notice: Subject to any disclaimer, the term of this patent is extended or adjusted under 35 U.S.C. 154(b) by 179 days.

(21) Appl. No.: 13/779,113

(22) Filed: Feb. 27, 2013

(65) Prior Publication Data

US 2013/0227038 A1 Aug. 29, 2013

Related U.S. Application Data

(60) Provisional application No. 61/605,090, filed on Feb. 29, 2012.

(51) Int. Cl.
| | |
|---|---|
| *H04N 21/262* | (2011.01) |
| *H04L 29/08* | (2006.01) |
| *G06F 17/30* | (2006.01) |
| *H04L 29/06* | (2006.01) |
| *G06Q 50/00* | (2012.01) |
| *H04N 21/4722* | (2011.01) |
| *H04N 21/4788* | (2011.01) |

(52) U.S. Cl.
CPC .... *H04L 29/06476* (2013.01); *G06F 17/30017* (2013.01); *G06Q 50/01* (2013.01); *H04L 65/4084* (2013.01); *H04L 67/06* (2013.01); *H04L 67/10* (2013.01); *H04N 21/26258* (2013.01); *H04N 21/4722* (2013.01); *H04N 21/4788* (2013.01)

(58) Field of Classification Search
None
See application file for complete search history.

(56) References Cited

U.S. PATENT DOCUMENTS

| | | | | |
|---|---|---|---|---|
| 6,389,467 | B1* | 5/2002 | Eyal | 709/223 |
| 8,258,390 | B1* | 9/2012 | Gossweiler et al. | 84/600 |
| 8,688,991 | B1* | 4/2014 | Sunil | 713/176 |
| 2004/0019497 | A1* | 1/2004 | Volk et al. | 705/1 |
| 2005/0210181 | A1* | 9/2005 | Depke et al. | 711/100 |
| 2006/0143236 | A1* | 6/2006 | Wu | 707/104.1 |
| 2006/0288112 | A1* | 12/2006 | Soelberg et al. | 709/231 |
| 2008/0319856 | A1* | 12/2008 | Zito et al. | 705/14 |
| 2009/0156170 | A1* | 6/2009 | Rossano et al. | 455/412.1 |
| 2009/0182843 | A1* | 7/2009 | Hluchyj et al. | 709/219 |
| 2011/0022500 | A1* | 1/2011 | Scheinfeld et al. | 705/27.2 |
| 2013/0091215 | A1* | 4/2013 | Funk et al. | 709/204 |
| 2013/0254812 | A1* | 9/2013 | McCoy et al. | 725/59 |
| 2014/0052770 | A1* | 2/2014 | Gran et al. | 709/203 |

* cited by examiner

*Primary Examiner* — Ninos Donabed
(74) *Attorney, Agent, or Firm* — Blakely, Sokoloff, Taylor & Zafman LLP

(57) ABSTRACT

In accordance with embodiments, there are provided mechanisms and methods for facilitating playlist assistance and sharing of media content over multiple media communities according to one embodiment. In one embodiment and by way of example, a method includes receiving, at a first computing device, a request relating to media content. The request may be placed by a user at a second computing device. The method may further include researching a plurality of media playlists at a plurality of media communities for the media content, selecting one or more of the plurality of media playlists at one or more of the media communities having the media content, and transmitting, from the first computing to the second computing device, the one or more media playlists having the media content.

11 Claims, 24 Drawing Sheets

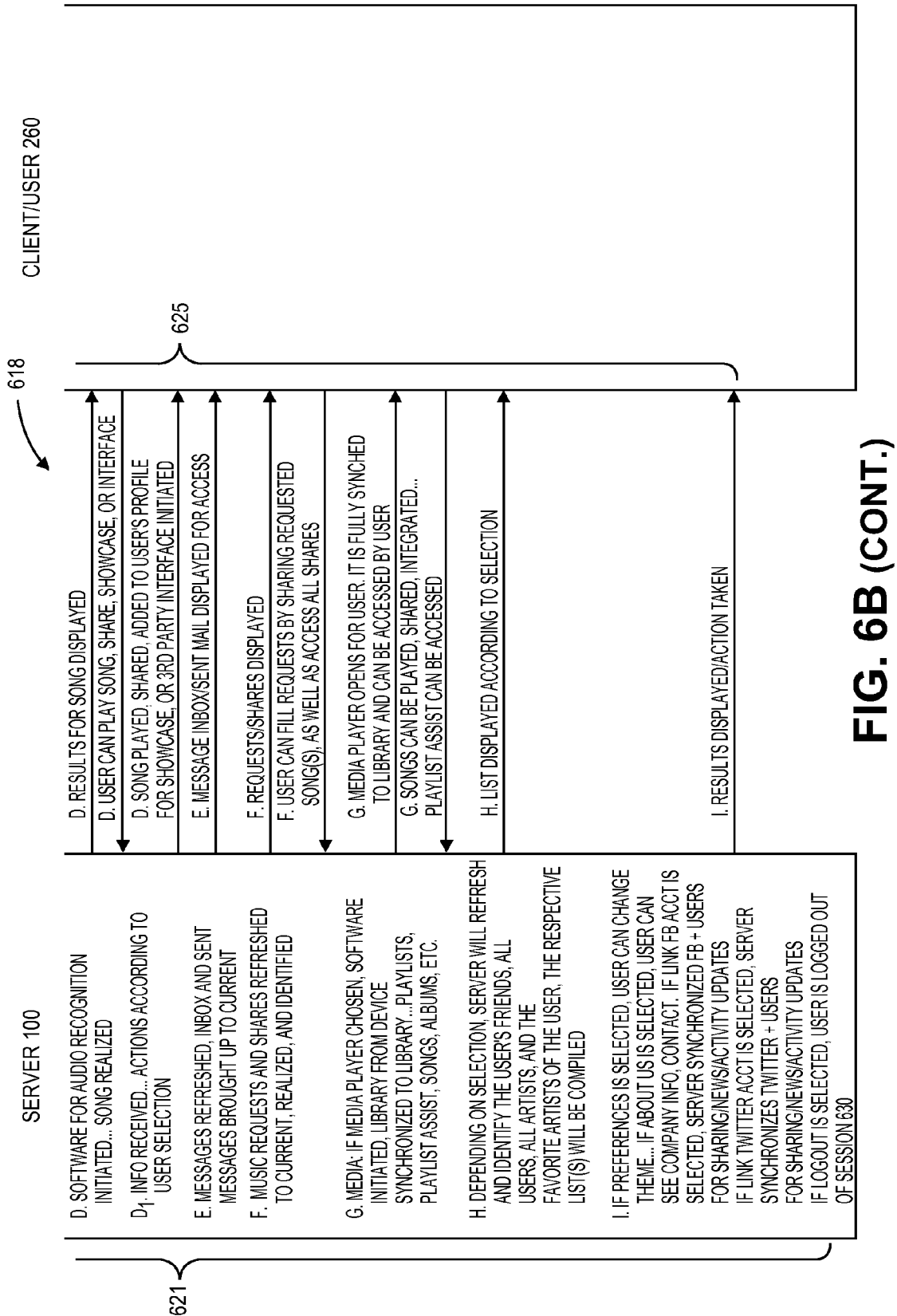

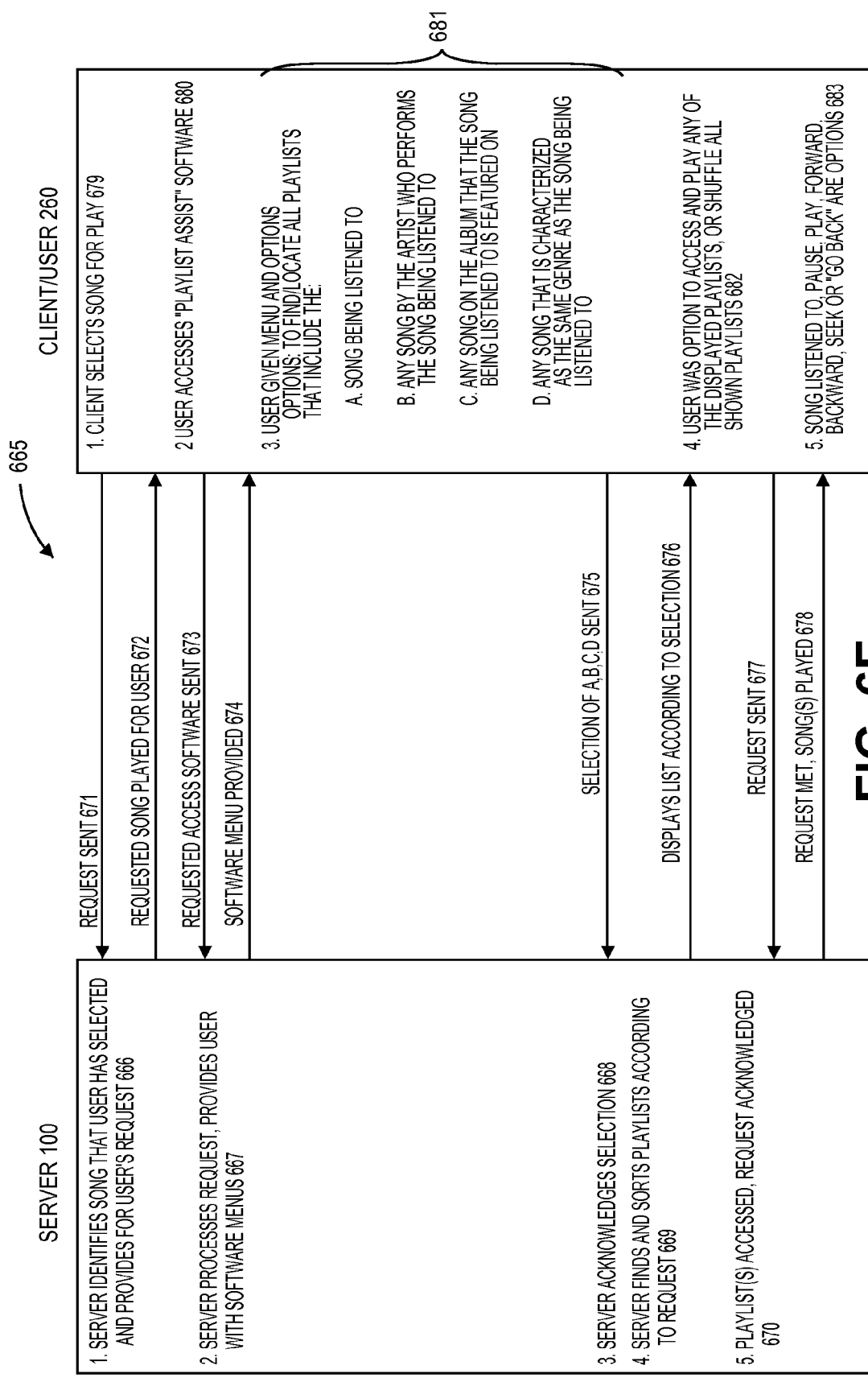

MECHANISM FOR FACILITATING USER-CONTROLLED FEATURES RELATING TO MEDIA CONTENT IN MULTIPLE ONLINE MEDIA COMMUNITIES AND NETWORKS

CLAIM OF PRIORITY

This application claims the benefit of U.S. Provisional Patent Application No. 61/605,090, entitled "Playlist Assist software that displays every playlist that includes any particular/selected track from a song library according to song, artist, or genre" by Bradly Freeman Rich, filed Feb. 29, 2012, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating user-controlled features relating to media content in multiple online media communities and networks.

BACKGROUND

With the increase in use of mobile computing and cloud networking, more and more individuals are using online media (e.g., audio/video media) communities for storing and accessing their audio/video files; however, the conventional systems are limited with regard to the control and ease they offer to their users when comes to organizing (e.g., accessing, searching, etc.) their audio/video files.

BRIEF DESCRIPTION OF THE DRAWINGS

In the following drawings like reference numbers are used to refer to like elements. Although the following figures depict various examples, one or more implementations are not limited to the examples depicted in the figures.

FIG. 6A-6E illustrate transaction sequences for facilitating playlist assistance and sharing of media content over multiple media communities according to one embodiment.

DETAILED DESCRIPTION

Figure 1:
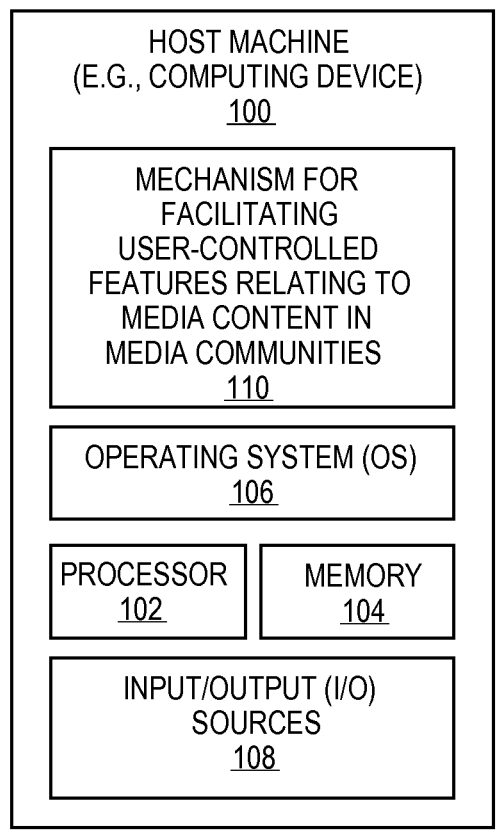
FIG. 1 illustrates a computing device employing a mechanism for facilitating user-controlled features relating to media content in media communities according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Methods and systems are provided for facilitating playlist assistance and sharing of media content over multiple media communities according to one embodiment. In one embodiment and by way of example, a method includes receiving, at a first computing device, a request relating to media content. The request may be placed by a user at a second computing device. The method may further include researching a plurality of media playlists at a plurality of media communities for the media content, selecting one or more of the plurality of media playlists at one or more of the media communities having the media content, and transmitting, from the first computing to the second computing device, the one or more media playlists having the media content.

Embodiments facilitate user-controlled performance of features relating to media content and media content files (e.g., audio/video files, such as audio files, video files, audio/video files, etc.) in multiple online media communities (e.g., music communities, video communities, etc.) over one or more networks (e.g., Internet, cloud network, etc.). Media content or media files refer to and may include audio content, video content or a combination thereof, such as audio/video files (collectively referred to as "media files" or simply "files"). For example, media files may include music files (e.g., songs, music videos, lectures, sports commentaries, etc.), film files (e.g., movies, silent movies, lectures, sports video or ballgames, home videos, etc.), etc. In one embodiment, features include playlist organization, sharing of files, etc. "Playlist" simply refers to a list of files, such as a list of songs, a list of movies, etc., that can be created, organized, accessed, and used by a user via computing device (e.g., a mobile computing device), whereas such playlists may be provided and administered by various organizations (e.g., companies, such as social network companies) through their online audio/video communities. For example and in one embodiment, a mechanism facilitates playlist assistance that displays every playlist that includes any particular or selected file or track (e.g., song, movie, show, etc.) from a library (e.g., a song library, movie library, etc.) according to a selected criteria (e.g., by song, by artist, by genre), etc. For example, when a user forgets which songs are on which playlists in the song library, today's conventional systems do not provide any technique for the user to know find that playlist without having to individually go through every single playlist in the library. In one embodiment, the mechanism facilitates displaying all playlists that are associated with each file by content (e.g., song, movie, lecture, home movie, documentary, concert, meeting notes/minutes, etc.), artist (e.g., singer, actor, producer, director, etc.), genre (e.g., rock, country, jazz comedy, adventure, drama, reality, etc.), title (e.g., album, song, etc.), rating or rating-related content (e.g., PG-13, R, violence, etc.), year of release (e.g., July 1967, 1998-99, 2013, etc.), etc.

For the sake of brevity, clarity, and ease of understanding, this document focuses on "music", such as, songs, songs playlists, online music communities, etc., however, it is to be noted that embodiments are not limited to music and that they are applicable to and workable with all forms of aforementioned files, content, playlists, music communities, etc.

FIG. 1 illustrates a computing device 100 employing a mechanism 110 for facilitating user-controlled features relating to media content in media communities according to one embodiment. In one embodiment, computing device 100 serves as a host machine employing a mechanism for facilitating user-controlled features relating to media content in media communities ("media mechanism") 110 for facilitating, for example, dynamic and user-controlled management of media playlists (e.g., searching which playlists include a particular song, etc.), efficient sharing of media files between users accessing different audio/video communities and/or networks, etc. "User" refers to an individual (e.g., a single or a group of individuals, such as a smartphone user, etc.) who can access various features provided by community mechanism 110 via a user interface offered through and by a software program or application (e.g., a website, a social network, such as Facebook®, etc., a downloaded software application or a cloud-based application, etc.) via a computing device (e.g., a mobile computing device) serving as a client computing device, such as computing device 260 of FIG. 2, that is in communication with mechanism 110 at a host machine, such as computing device 100, over a network, such as network 250 of FIG. 2.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. It is to be noted that the use of certain terms, such as "Sonafire®", "Playlist Assist®", "sound board", "soundboard", or the like, should not be read to limit embodiments to software or devices that carry that label in products or in literature external to this document.

Figure 2:
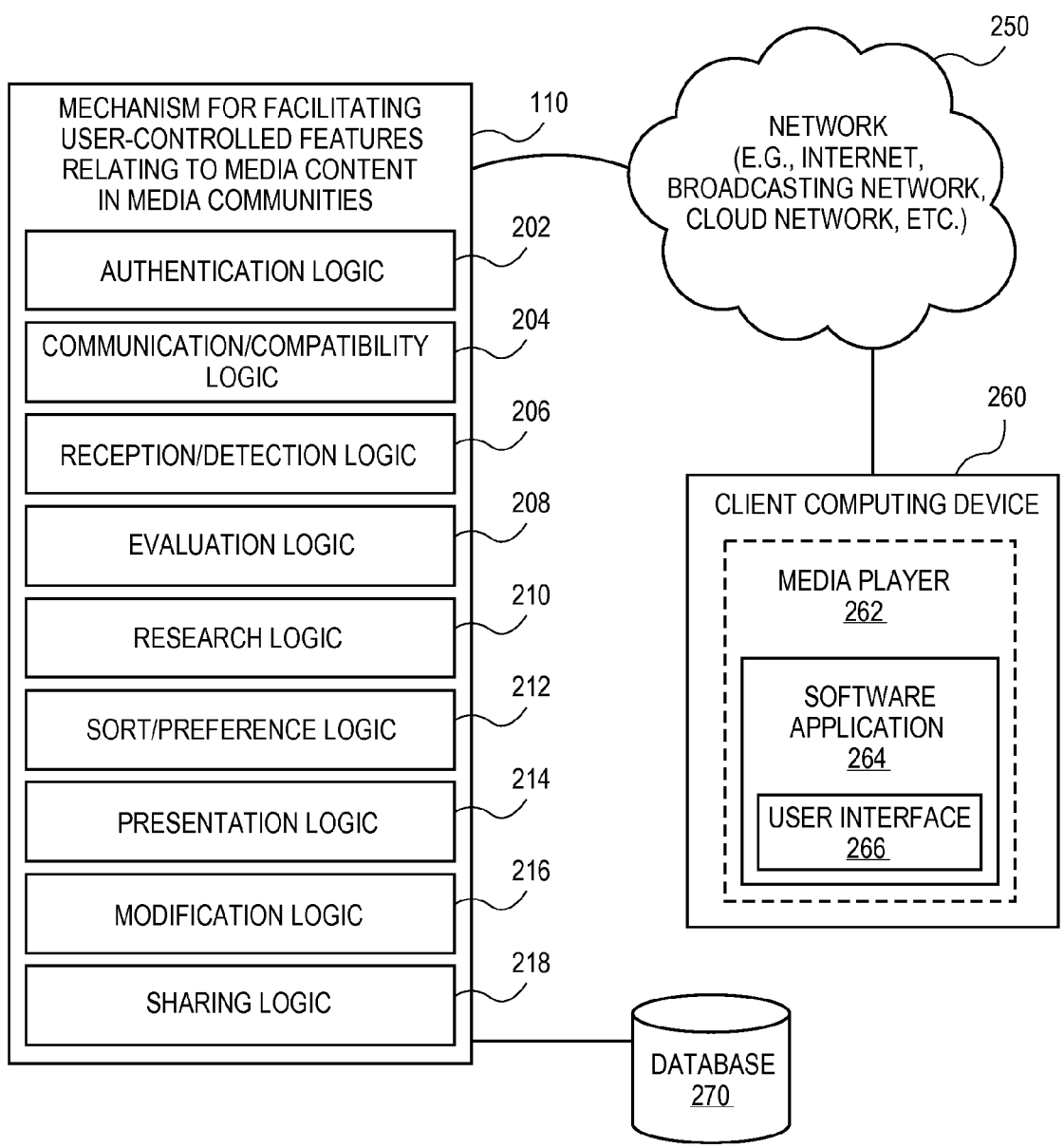
FIG. 2 illustrates a mechanism for facilitating user-controlled features relating to media content in media communities according to one embodiment.

FIG. 2 illustrates a mechanism 110 for facilitating user-controlled features relating to media content in media communities according to one embodiment. In one embodiment, media mechanism 110 may include various components, such authentication logic 202, communication/compatibility logic 204, reception/detection logic 206, evaluation logic 208, research logic 210, sort/preference logic 212, presentation logic 214, modification logic 216, and sharing logic.

In one embodiment, media mechanism 110 provides a media library playlist assistant for media playlists (e.g., songs playlists) to locate, identify, and provide access, to any particular type of user, to songs and other types of media content in one or more media playlists in one or more media communities over one or more networks 250, eliminating the traditional laborious method of manually going through each and every playlist to find the media content, such as a song. In one embodiment, media mechanism 110 also provides an efficient media-sharing technique such that media content may be shared between any number of users using any number and type of media communities over one or more networks 250. Examples of media communities or organizations (e.g., social media networks/products) that provide media communities include, but are not limited to, Sonafire®, HipSet®, HotFile®, MySpace®, RapidShare®, SoundCloud®, Spotify®, Viveo®, YouTube®, Facebook®, etc.

It is contemplated that any number and type of components may be added to and/or removed from media mechanism 110 to facilitate various embodiments including adding, removing, and/or enhancing certain features. For brevity, clarity, and ease of understanding of media mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, media mechanism 110 may be in communication with database 270 to store any type and amount of content including data, metadata, tables, reports, etc., relating to messaging queues, etc. Media mechanism 110 may be further in communication with any number and type of client computing devices, such as client computing device 260, over a network, such as 260. Throughout this document, the term "logic" may be interchangeably referred to as "framework" or "component" or "module" and may include, by way of example, software, hardware, and/or any combination of software and hardware, such as firmware. This combination of components provided through media mechanism 110 facilitates user-based control and manipulation of media content, via software applications (e.g., social websites, business websites, word processing, spreadsheets, database products, etc.), to be organized, manipulated, shared, communicated, and displayed in any number and type of ways, as desired or necessitated by the user, and communicated with the user through user interface 266 at client computing device 260 and over network 250.

It is contemplated that a user may include an administrative user or an end-user. An administrative user may include an authorized and/or trained user, such as a system administrator, a software developer, a computer programmer, etc. In contrast, an end-user may be any user that can access client computing device 260, such as via software application 264 (e.g., Internet browser). In one embodiment, a user, via user interface 266 at client computing device 260, may manipulate or request media content as well as view the data and any related metadata in a particular format (e.g., table, spreadsheet, etc.) as desired or necessitated by the user. In one embodiment, the user may listen to and/or view the media content (e.g., songs, movies, etc.) using media player 262 (e.g., Windows® media player by Microsoft®, QuickTime® by Apple®, open-source MPlayer®, etc.).

In one embodiment, media mechanism 110 may be employed at a server computing system, such as computing device 100 of FIG. 1, and may be in communication with one or more client computing devices, such as client computing device 260, over a network, such as network 250 (e.g., a cloud-based network, the Internet, etc.). Client computing device 260 may be the same as or similar to computing device 100 of FIG. 1 and include a mobile computing device (e.g., smartphones, tablet computers, laptops, etc.) or larger computers (e.g., desktop computers, server computers, etc.).

In one embodiment, authentication logic 202 may be used to authenticate users (e.g., computing device users), user requests (e.g., finding playlists that contain a particular song, etc.), devices (e.g., computing device 260), etc. For example, a user may be authenticated using a user account that the user may have created at some point to be able to access the system to benefit from media mechanism 110, such as the user may be asked to provide one or more of a userID, a username, a password, a passcode, etc. Similarly, in one embodiment, the user's computing device 260 may be authenticated and in some embodiments, each user request may also be authenticated. It is contemplated that in one embodiment, the authentication process may be a one-time process conducted when, for example, computing device 260 is first allowed to access media mechanism 110 or, in another embodiment, authentication may be a recurring process that is performed each time a user request is received at or detected by reception/detection logic 206 at media mechanism 110 being hosted at a server computing device (such as host machine 100 of FIG. 1) via network 250.

In one embodiment, communication/compatibility logic 204 may be used to provide communication and compatibility with and between various computing devices, such as a server computing system hosting media mechanism 100 and any number and type of client computing systems, such as computing device 260. Communication/compatibility logic 204 may further provide communication and compatibility with and between various media players, media communities, networks, etc. In one embodiment, reception/detection logic 206 may be used to receive or detect user requests. Once a request has been placed, it may be evaluated for its content by evaluation logic 208. For example, once the request is placed, evaluation logic 208 determines the content and the nature of the request, such as whether the user is requested a song or an artist or a genre, etc. The evaluation results may then be provided to research logic 210 to perform a research of any number of media playlist and in some embodiments, a number of user accounts on various media communities and/or social media websites to determine which media playlists contain the song, artist, and/or genre requested by the user. Any research results (e.g., media playlists, social media accounts, etc.) are then provided to sort/preference logic 212.

In one embodiment, upon receiving the research results, sort/preference logic 212 sorts through the research results in accordance with user-defined preferences or in the absence of the user-defined preferences, according to an already user-defined or system-defined default pattern. For example, if the user selects a song, all playlists having the requested song may be sorted by playlist names (e.g., this may be the defined pattern). If, however, for example, the user chooses another sort pattern, such as by playlist creation date, by playlist access date, by relevance, etc., sort/preference logic 212 sorts the results in accordance with the user-preference sort pattern. The sorted results are forwarded on to presentation logic 214 to present the results to the user. For example and in one embodiment, presentation logic 214 may provide the sorted results to media player 262 where the user can and play the various media playlists. It is contemplated that media player 262 may be seen using a display screen/device couple that may part of computing device 260 (e.g., smartphone screen, tablet computer screen, etc.) or a separate display screen/device may be connected to computing device 260. The displayed or presented playlists may then be available to the user for choosing, selecting, playing, moving, deleting, shuffling, and the like. It is contemplated that although a song is used as an example for brevity and clarity, embodiments are not limited to it and that the user may request an artist, a genre, etc., or a different sort of media content, such as a movie, a lecture, a presentation, a home movie, etc.

Modification logic 216 is provided to facilitate any changes the user may choose to make to the media content (e.g., songs, etc.) once receiving the results through media player 262. For example, using user interface 266 or through a menu provided by media player 262, the user may choose to simply select and play the song, delete the song from one or more media playlists, move the song from one media playlist to another media playlist, adding the song to another media playlist, shuffling one or more playlists, etc. Modification logic 216 may recognize and facilitate any number and type of such modification requests. Furthermore, in one embodiment, sharing logic 218 may be employed by media mechanism 110 to share the media content with other users (e.g., friends, family, strangers, etc.) by posting the media content (e.g., via a social media website, such as Facebook®, etc.) or sending the media content (e.g., via email, text, etc.) to others. Sharing logic 218 may provide an efficient, legal, and progressive manner of sharing where the user and the media content are both full protected in sharing any number and type of media content over any number and type of media communities over any number and type of networks. Further, database 270 is provided to store any information including data and metadata relating to and including media playlists and any relevant metadata to be accessed and used as necessitated.

For example, on the client-side, using client computing device 260, a "song" is selected to play by a user using user interface 266 be present on the screen. Upon selection of the song, a list of user's playlists that include the selected song being listened to may be displayed to the user via media player 262. Now, for example, if "artist" is selected by the user, then a list of the user's playlists that include all songs by the selected artist of the song being listened to is provided to the user via media player 262. Now, if "genre" is selected, then a list of the user's playlists including the genre of the particular song being listened to will appears for the user via media player 262. Now, if the user chooses to modify the results by choosing to "shuffle", then all songs from the list of playlists may shuffle. If one of the individual playlists is selected, then the songs from that particular playlist will be shown. Any of those songs can be selected to play or the shuffle playlist option can be selected, which will shuffle only the songs from that playlist.

Each user request may bring about a new set of selections for the user. For example, if any given song is being played by the user and the user wishes to see what playlists have been customized to include that song, artist, or genre, etc., the user may access those lists using the software, which is accessible directly through any given song. Once all of the playlists associated with that song appear, it may then be the user's choice whether to access one of the playlists, shuffle all of the songs from each of the playlists, edit a specific playlist or go back to the original song, etc. In one embodiment, all of these processes or tasks may be accomplished without having to stop or pause the song, such as even if the song was being played before accessing media mechanism 110. If a playlist is selected, a link to that playlist may be generated and any song can be selected within that playlist for playing or even for determining which playlists that particular song is on. This technique provides full accessibility to all of the user's playlists through a song search. Further, this includes, but is not limited to, any screenshot from which a song is played, the entire library of songs, or through a specific song search, etc.

Reception/detection logic 206 may receive and recognize the media content, such as song tracks, in each playlist by, for example, track name, artist, and genre, etc., and compile a list of playlists according to each particular song and where each track is included. If a song is selected, then there may be a gateway to a list of all of those associated playlists. If any of the playlists are selected, then there will be a "gate" or a link to that particular playlist's songs, and if "shuffle all playlists" is selected, then all of those songs may be accessed as one larger, compiled temporary playlist.

In one embodiment, each process may be reversible, such as a may have the choice of going back after each and any decision by simply clicking, for example, a "back" button. Further, various elements may be shuffled in such a way where new playlists may be created or accessed in a different method or displayed with the media content, such as a song. Further, any media content and the corresponding playlists may be cataloged to create a separate archive or access point.

In one embodiment, media mechanism 110 further provides audio recognition-based sharing, via research logic 210 and/or sharing logic 218, to allow the user to activate, for example, software application 264 via media player 262 to recognize any particular media content file (e.g., song, movie, etc.) being listened to through an third-party listening device (e.g., external speaker, etc.) or any other form of device or the like that produces audible sound or vibrations. For example and in one embodiment, without needing to permanently download that particular media content file, research logic 210 and/or sharing logic 218 facilitate the audio recognition-based sharing feature of media mechanism 110 that checks various libraries (e.g., audio file library, video file library, etc.), various cloud audio/video/media providers, and any number and type of third-party partner sites, etc., for that particular song. Once the media content file (e.g., song, movie, etc.) is found, identified, and/or realized, presentation logic 214 presents the user any number of options, such as to play the media content file via media player 262, share the media content file, share the news of the user playing the media content file, purchase the media content file from any number and type of music vendors (e.g., iTunes®, etc.), and/or interface that particular file within the same/home website (e.g., Sonafire®, etc.) or any number and type of third-party websites (e.g., Spotify®, Pandora®, YouTube®, etc.).

In some embodiments, presentation logic 214 may further facilitate a notification service (e.g., a news feed) via user interface 266 (e.g., a popup, an email, a text, a sound message, etc.) that may dynamically indicate any amount of details (e.g., name, year of release, when requested, etc.) regarding media content files (e.g., songs, audio files, movies, videos, albums, genres, etc.) that are being (or have been) accessed, shared, viewed, played, etc., the most or highest number of times ("high traffic" or "trending upward") and/or the least or lowest number of times ("low traffic" or "trending downward") at the moment or time that particular aspect (e.g., "list", such as playlist, sub-playlist to one or more playlists) is being viewed. For example, if a user takes an action and/or there is an occurrence of an even in or relating to any or each category (e.g., type of media content files, etc.), the corresponding list (e.g., playlist, sub-playlist) may automatically update, change, sort, and/or group to indicate which media content files are being accessed, shared, viewed and/or played the most and/or the least. This technique provides the user with an up-to-date/current list (e.g., playlist, sub-playlist to one or more playlists) for viewing along with having the opportunity to know and access the high traffic files, trending files, low traffic files, etc., in a separate list (such as a sub-playlist) according to the number of times the users on the home or third-party website/media community have accessed, shared, viewed, play, etc., or used in anyway each individual file, such as a song, a movie, any other audio/video file, an album, a genre, etc.

Communication/configuration logic 204 may facilitate the ability to dynamically communicate and stay configured with various media content files, media players, media communities, etc. Communication/configuration logic 204 further facilitates the ability to dynamically communicate and stay configured with various computing devices (e.g., mobile computing devices (such as various types of smartphones, tablet computers, laptops, etc.), networks (e.g., Internet, cloud-computing network, etc.), websites (such as media community and/or social networking websites (e.g., Facebook®, LinkedIn®, Google+®, etc.)), etc., while ensuring compatibility with changing technologies, parameters, protocols, standards, etc.

It is contemplated that any number and type of components may be added to and/or removed from media mechanism 110 to facilitate various embodiments including adding, removing, and/or enhancing certain features. For brevity, clarity, and ease of understanding of the media mechanism 110 many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
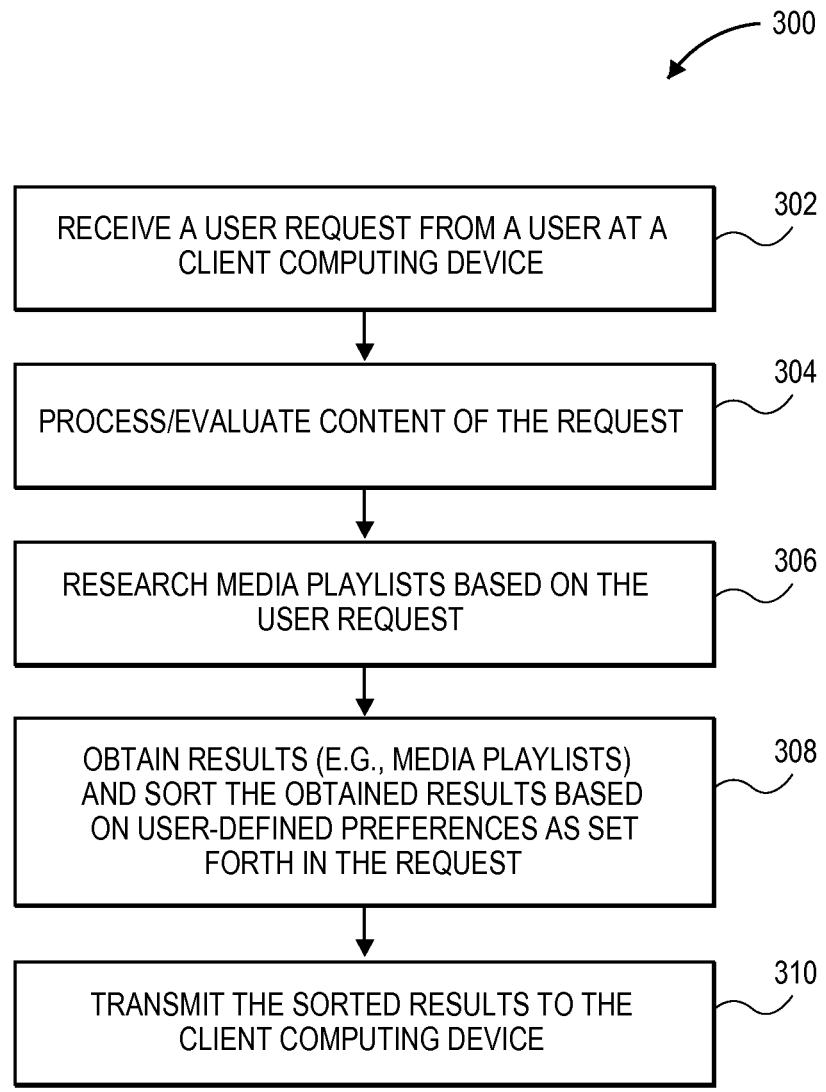
FIG. 3A illustrates a method for facilitating playlist assistance and sharing of media content over multiple media communities according to one embodiment.

FIG. 3A illustrates a method 300 for facilitating playlist assistance and sharing of media content over multiple media communities according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by media mechanism 110 of FIG. 1.

Method 300 begins at block 302 with receiving a user request from a user for media content (e.g., song, artist, genre, etc.) that the user may review or play (e.g., play a song) at a client computing device via a display screen of a media player. Further, in one embodiment, a software application may be part of or associated with the media player providing a user interface for the user to place the request, cancel an already-placed request, modify results, etc. At block 304, the user request is processed or evaluated for its content, such as which media content is being played or requested by user, a result format or preference requested by the user, etc. For example, the user may prefer to have the results provided in an alphabetical order of the names of the playlists containing the requested media content, such as a song.

At block 306, a research of various media communities, user accounts, databases, etc., is performed to seek, for example, media playlists containing the requested song. At block 308, results (e.g., media playlists) of the user request are obtained (e.g., all media playlists including the requested media are obtained) and sorted according to the preference (e.g., user-defined preference) set forth in the user request. At block 310, the results are transmitted and presented to the user at the client computing device in accordance with the user preference-based sorting (e.g., all media playlists having the requested song are provided by alphabetical order, etc.), where the results may be displayed using the media player and a display screen associated with the client computing device. Further, the results may be shared (e.g., by posting, emailing, messaging, etc.) by the user with other users.

Moreover, in one embodiment, any number of requests may be received from the user and these request may request modification to the results, such as reverse the alphabetical order, switch from alphabetical order to another format (e.g., by user account, by date, by relevance, etc.), delete any media content from the playlists, add media content to the playlists, make other miscellaneous changes to the playlists, etc. In response to such a request, necessary and appropriate modifications may be made to the results and the modified results may be retransmitted to the client computing device for the user to review, view, share, and make any other modifications.

Figure 3B:
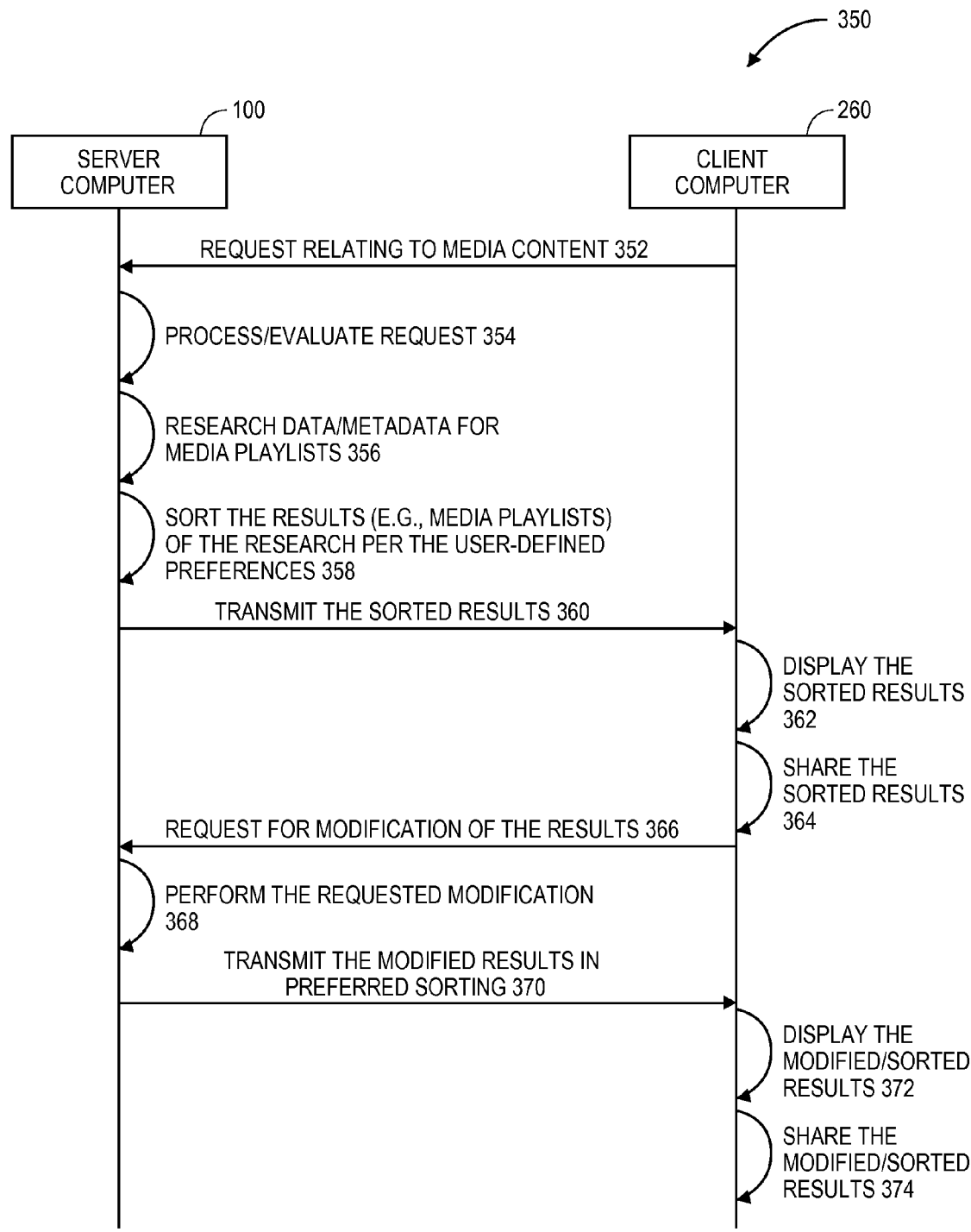
FIG. 3B illustrates a transaction sequence for facilitating playlist assistance and sharing of media content over multiple media communities according to one embodiment.

FIG. 3B illustrates a transaction sequence 350 for facilitating playlist assistance and sharing of media content over multiple media communities according to one embodiment. Transaction sequence 350 may be performed by processing logic that may comprise hardware (e.g., circuitry, dedicated logic, programmable logic, etc.), software (such as instructions run on a processing device), or a combination thereof. In one embodiment, transaction sequence 350 may be performed by media mechanism 110 of FIG. 1.

Transaction sequence 350 begins with a user request received 352 at a server computing device 100 hosting media mechanism 110 of FIG. 1, where the user request is received from a user via client computing device 260 having a media player 262 associated with a software application 264 offering a user interface 266 of FIG. 2. The user request may for media content (e.g., song, artist, genre, etc.) that the user may wish to review or play (e.g., play a song) at a client computing device 260 via a display screen of a media player. Further, in one embodiment, a software application may be part of or associated with the media player providing a user interface for the user to place the request, cancel an already-placed request, modify results, etc. The user request is then processed or evaluated for its content 354, such as which media content is being played or requested by user, a result format or preference requested by the user, etc. For example, the user may prefer to have the results provided in an alphabetical order of the names of the playlists containing the requested media content, such as a song.

Upon completing the evaluation, a research of various media communities, user accounts, databases, etc., is performed 356 to seek, for example, media playlists containing the requested song. The results of the user request are obtained (e.g., all media playlists including the requested media are obtained) and sorted 358 according to the preference set forth in the user request. The sorted results are then transmitted and presented 360 to the user at the client computing device in accordance with the user preference-based sorting (e.g., all media playlists having the requested song are provided by alphabetical order, etc.), where the results may be displayed 362 using the media player and a display screen associated with the client computing device. Further, the results may be shared 364 (e.g., by posting, emailing, etc.) by the user with other users.

Moreover, in one embodiment, any number of requests may be received 366 from the user and these request may request modification to the results, such as reverse the alphabetical order, switch from alphabetical order to another format (e.g., by user account, by date, by relevance, etc.), delete any media content from the playlists, add media content to the playlists, make other miscellaneous changes to the playlists, etc. In response to such a request, necessary and appropriate modifications may be made to the results 368 and the modified results may be retransmitted 370 to the client computing device for the user to review, view, share, and make any other modifications 372, 374.

Figure 4A:
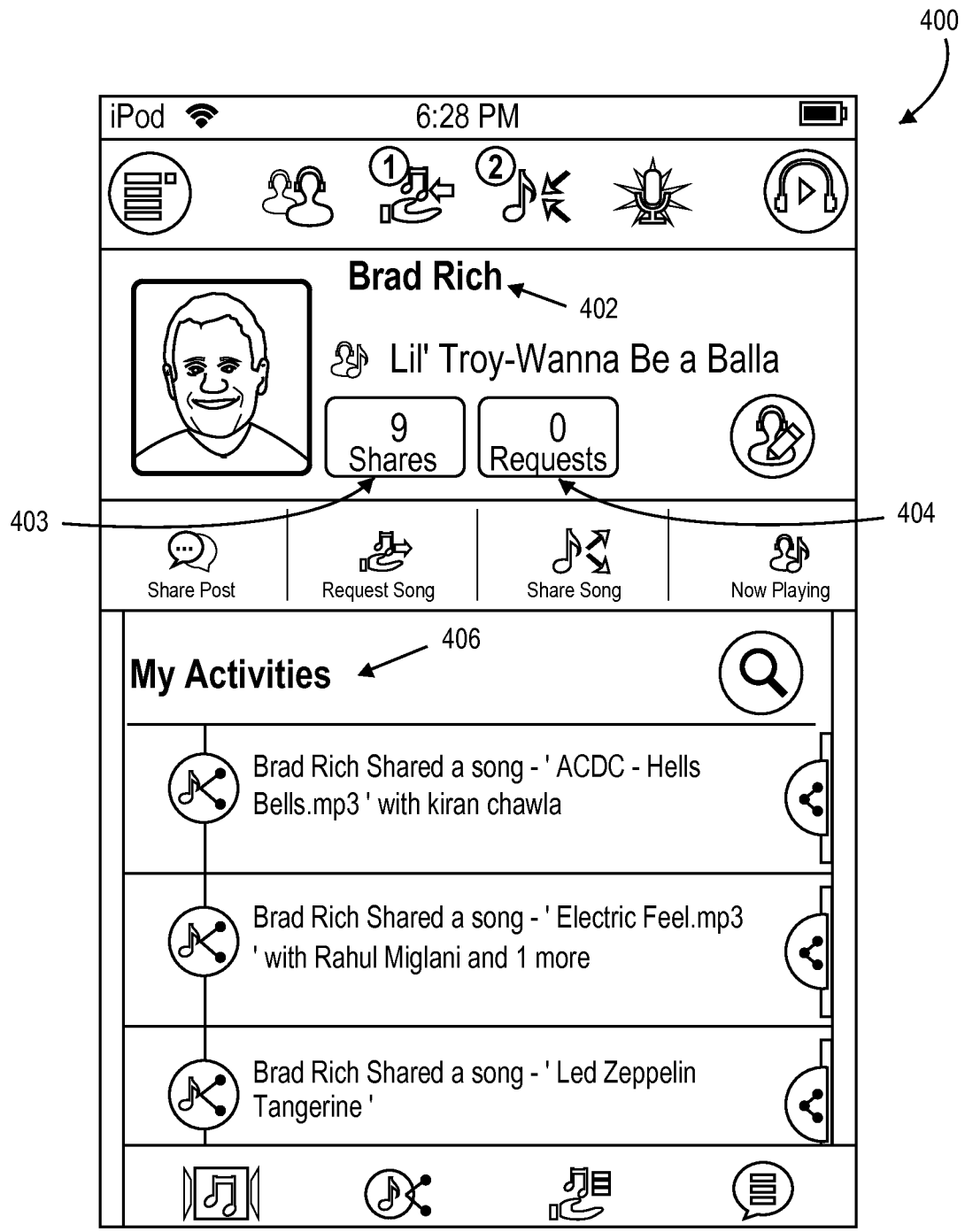
FIGS. 4A-4M illustrates screenshots according to some embodiments.
Figure 4B:
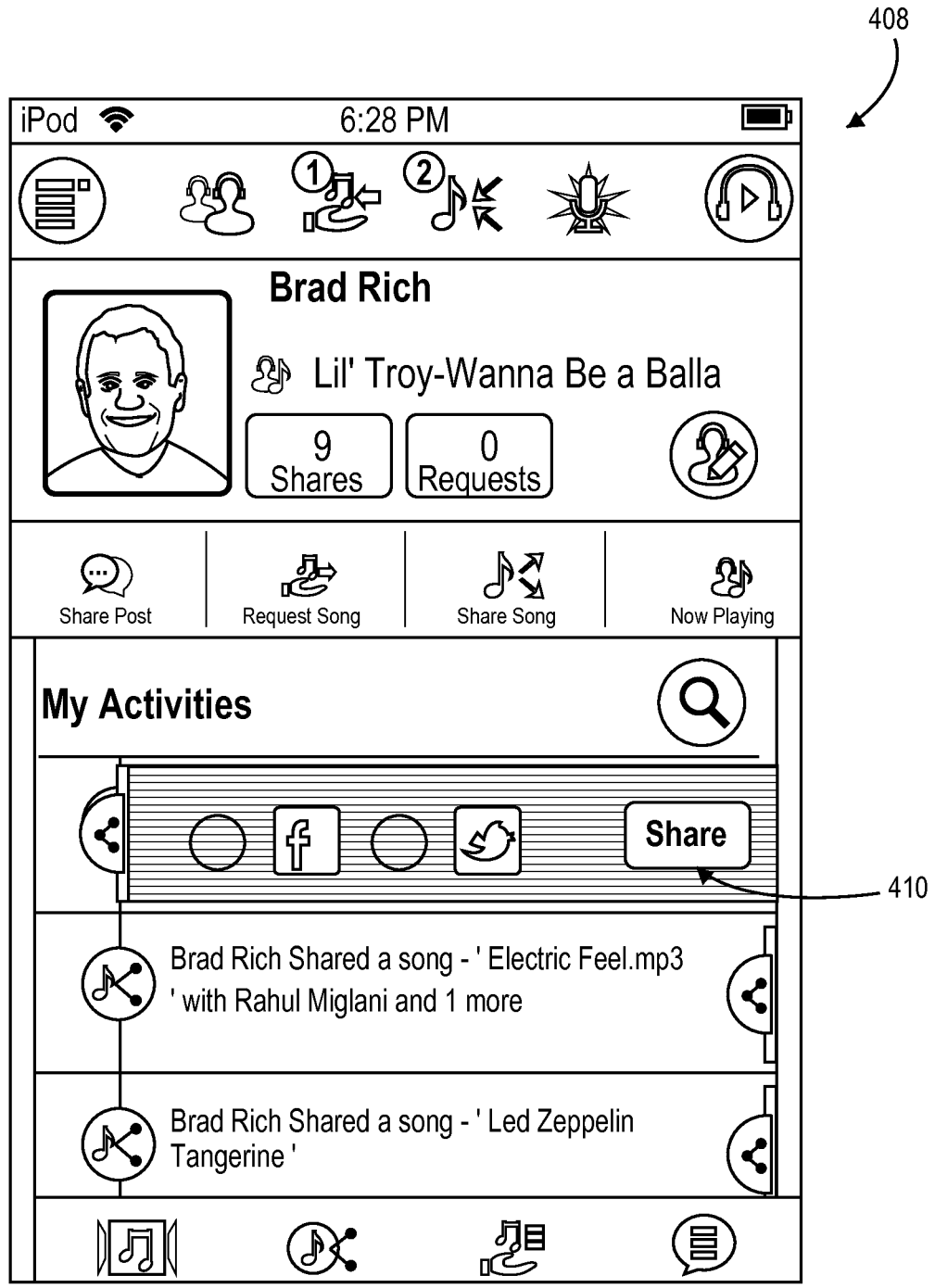
Figure 4C:
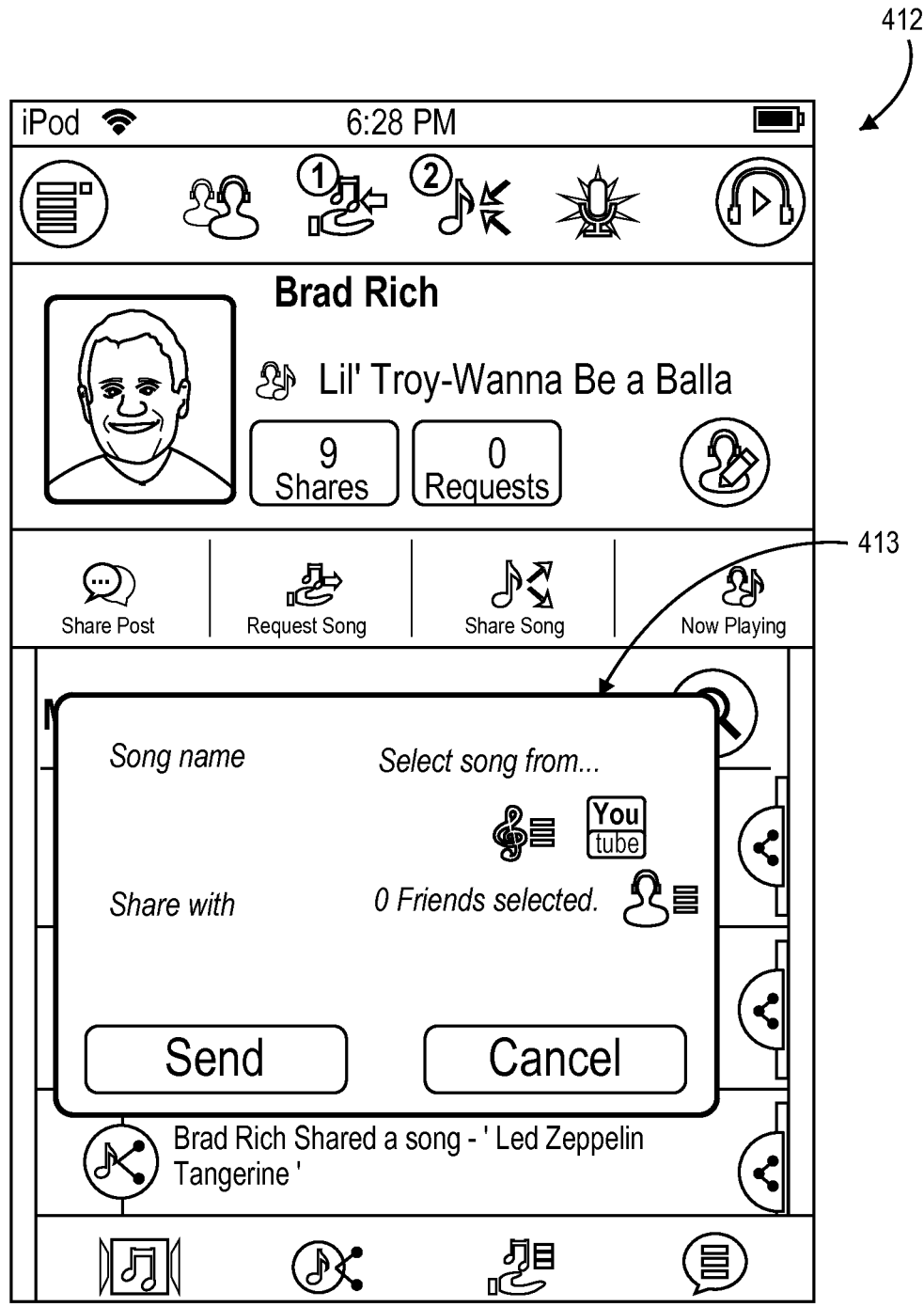

FIGS. 4A-4M illustrates screenshots according to some embodiments. FIG. 4A illustrates an embodiment of a profile page 400 showing the name of the user 402, a number shared media content 403, a number of pending requests 404, user activities 406 (providing certain details, such as names of the people with whom the user shared any media content, such as a song). FIG. 4B illustrates an embodiment of a profile page 408 showing an option of sharing 410, such as via Facebook®. FIG. 4C illustrates another embodiment of a profile page 412 showing another option of sharing 413, such as selecting a song from a media community (e.g., YouTube, etc.) and sharing the selected song by sending it to one or more friends.

Figure 4D:
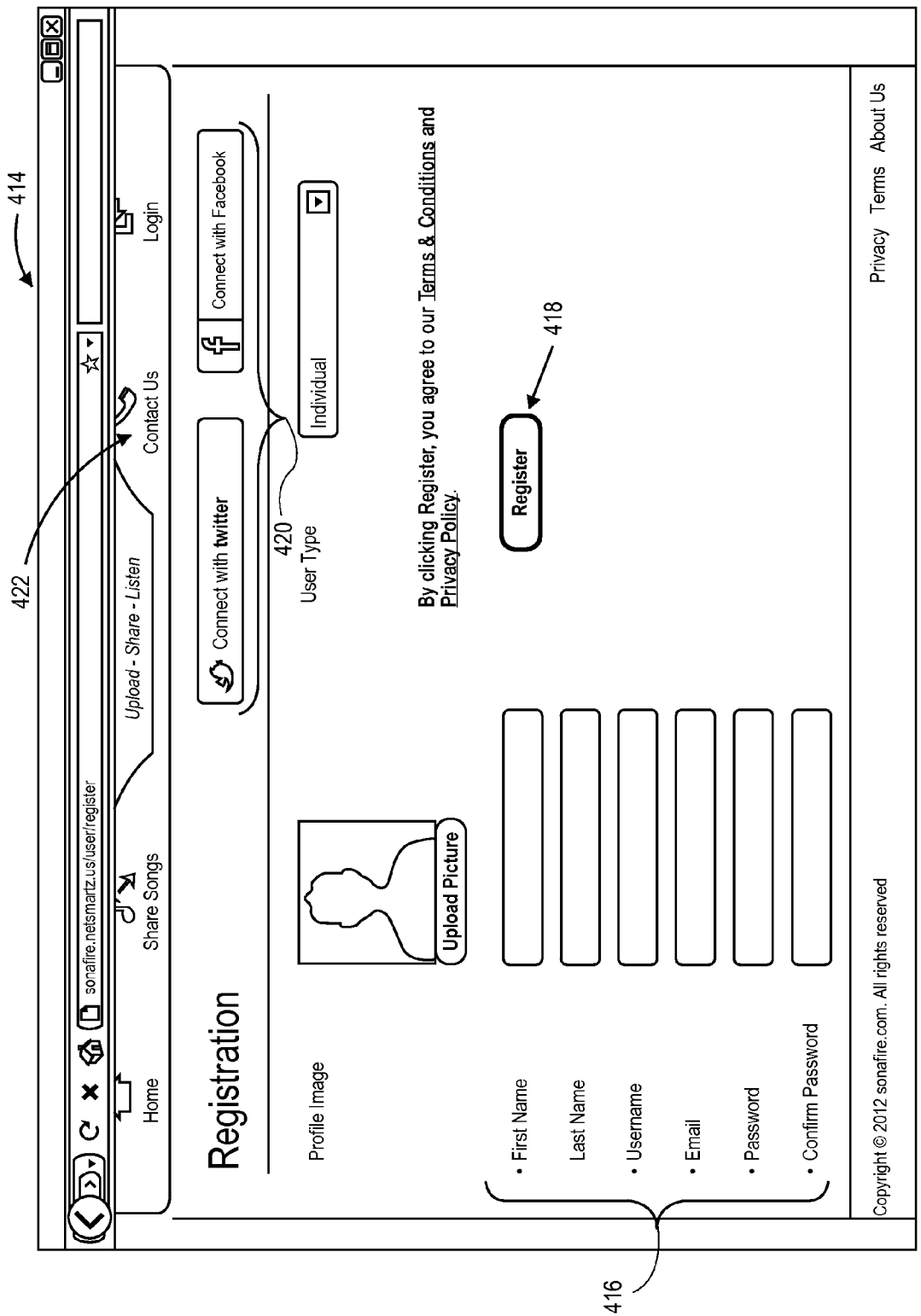
Figure 4E:
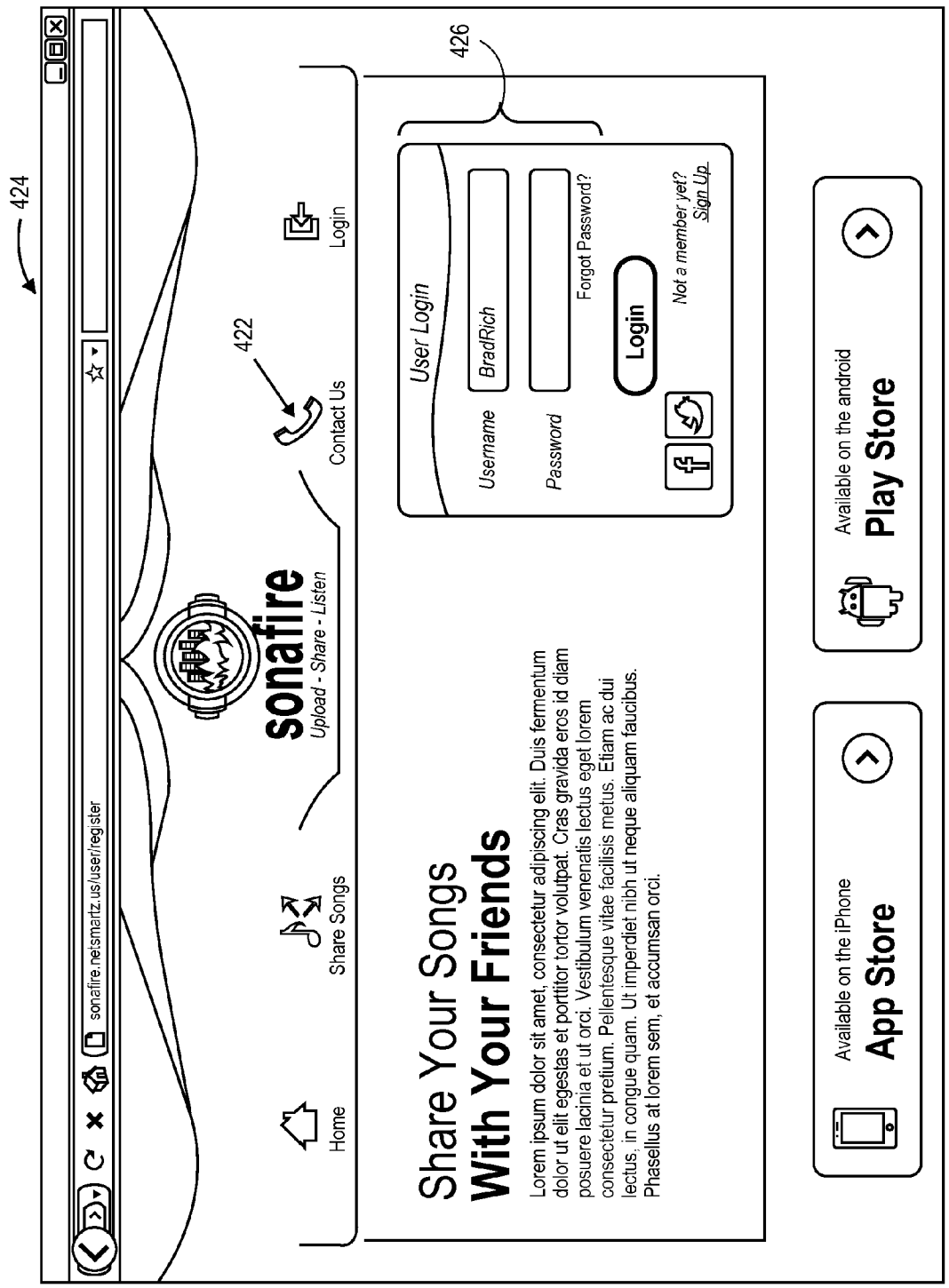

Referring now to FIG. 4D, it illustrates an embodiment of a registration page 414 for a user to register for the product to fully take advantage of the various features (e.g., playlist assistance, sharing of media content, etc.) provided by media mechanism 110 of FIG. 1. In one embodiment, a user may register by providing certain basic information by filling out a form 416 seeking that information, such as first name, last name, username, email address, password, confirmation of password, etc., and then simply clicking register 418. In another embodiment, the user may choose to register through an existing online account 420, such as connection with Twitter®, connect with Facebook®, etc. In yet another embodiment, the user may choose to register via telephone or email or simply to seek help by clicking contact us 422. Once the user is registered through the registration page 414, the user is then taken to, or anytime thereafter when the user wishes to access the services, an embodiment of a welcome page 424 of FIG. 4E. Welcome page 424 provides a user login window 426 for the user to login using the previously-created username and password. For help, the user may choose click contact us 422 to call and/or email for help.

Figure 4F:
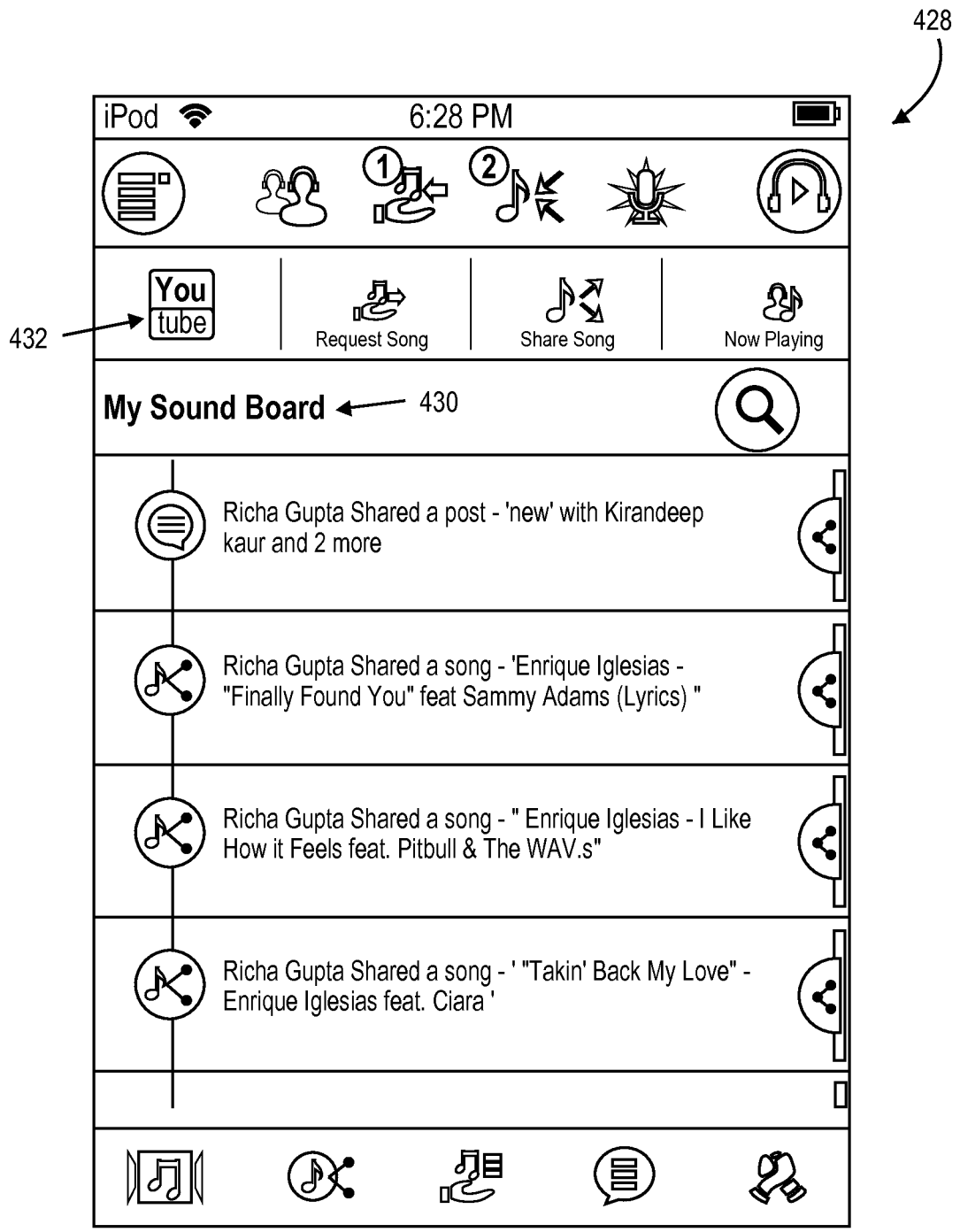

Now referring to FIG. 4F, it illustrates an embodiment of a soundboard page 428 to provide the user-specific soundboard, such as "my soundboard" or "my sound board" 430. My sound board 430 may list user activities with regard to media content, such as sharing or posting a song, etc. My sound board 430 may further list the names of one or more media communities 432 that may be used by the user for various activities, such as sharing media content, posting media content, requesting media content, etc.

Figure 4G:
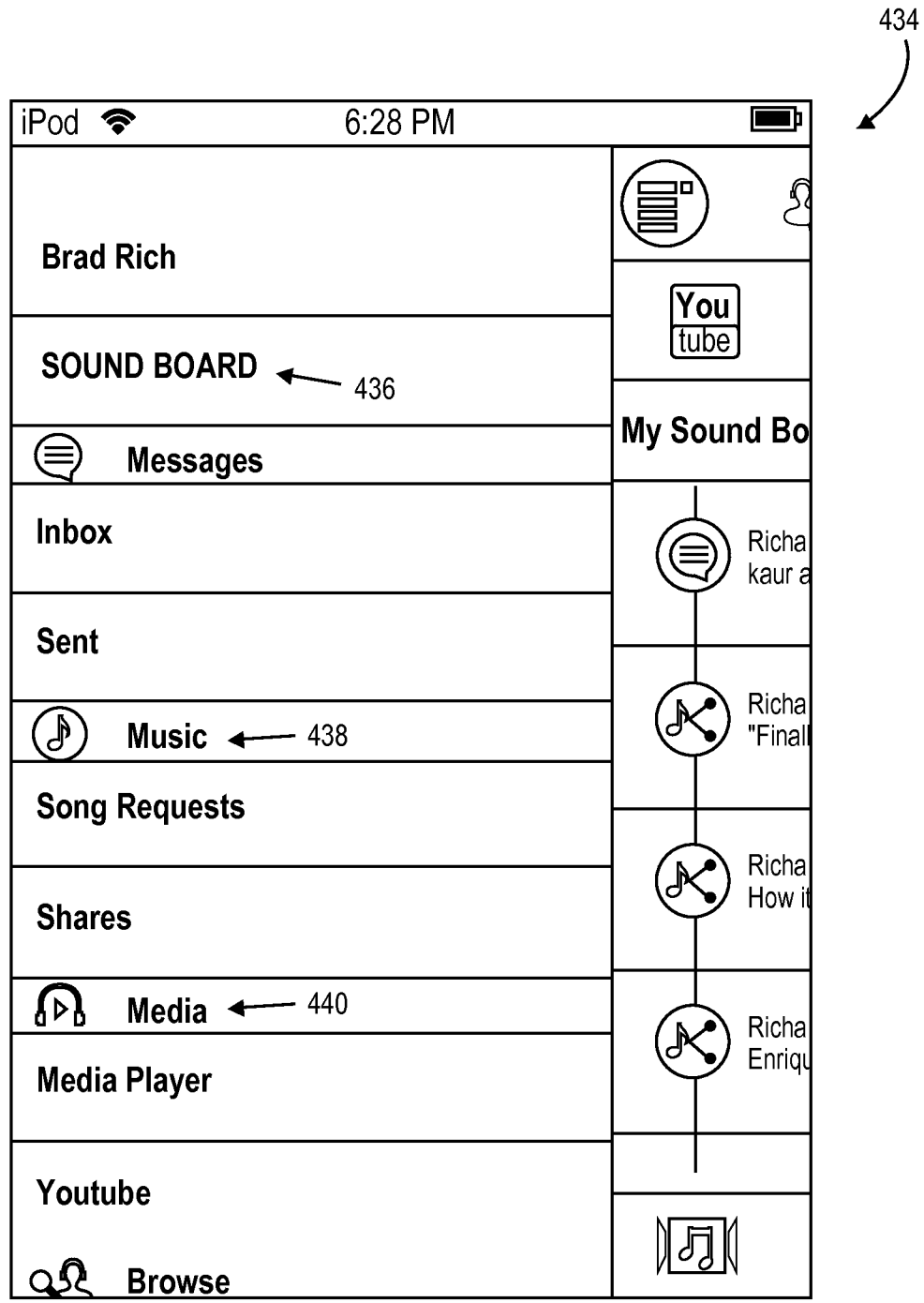
Figure 4H:
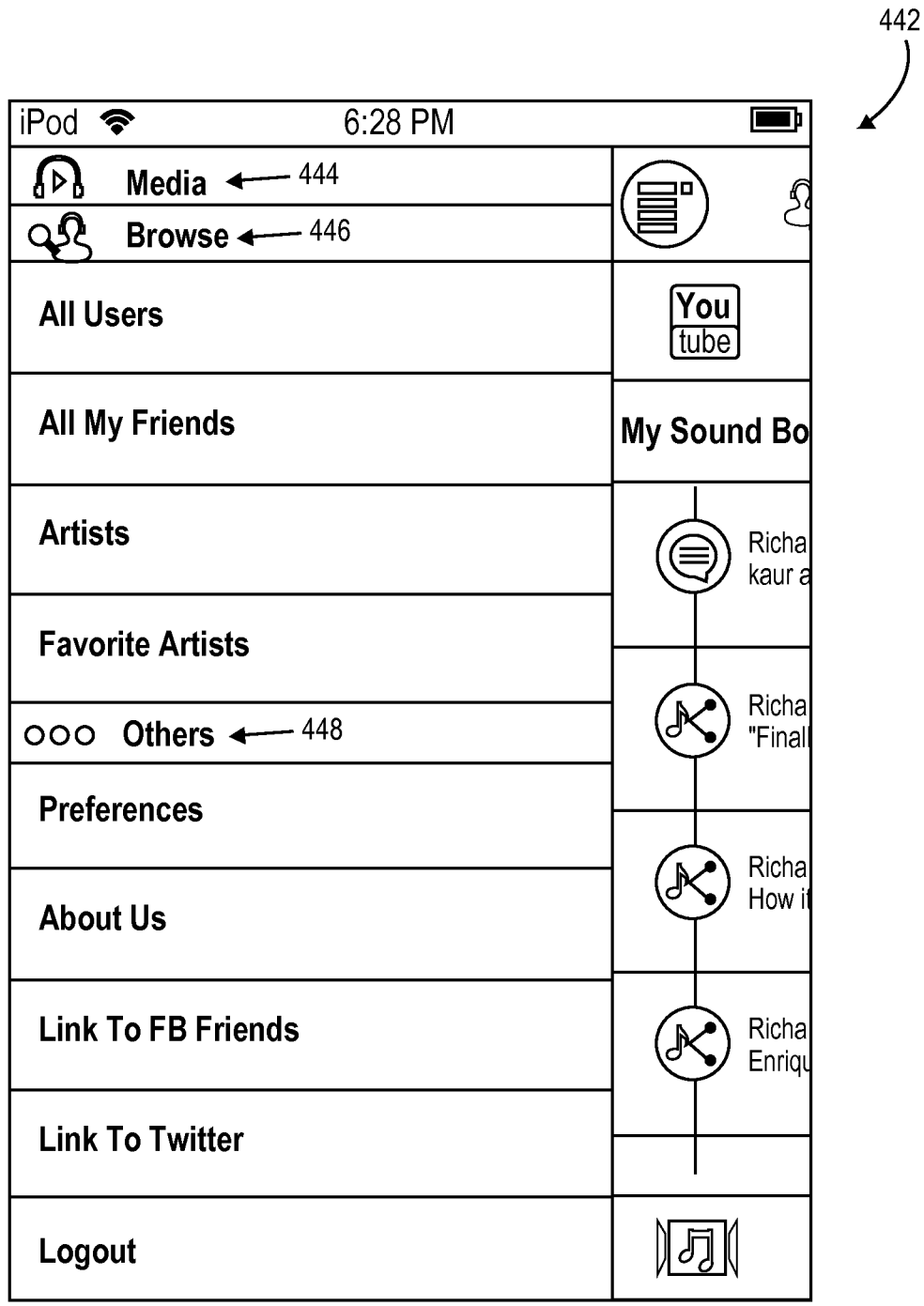

Referring now to FIG. 4G, it illustrates an embodiment of a toolbar page 434 to provide an embodiment of a toolbar partitioned into various segments, such as messages 436 (e.g., email, etc.), music 438 (e.g., songs requested, songs shared, etc.), media 440 (e.g., media player, media community, etc.), etc., for the user to choose and perform any number of tasks facilitated by media mechanism 110 of FIG. 1. FIG. 4H illustrates another embodiment of a toolbar 442 providing a media section 444, a browse section 446 which the user can use to browse various activities relating to other users, the user's friends, artists, favorite artists, etc., and other sections 448, such as user preferences, information about the company ("about us"), link to friends on various online accounts (e.g., link to Facebook® friends, link to Twitter® friends, etc.), an option of logging out, etc.

Figure 4I:
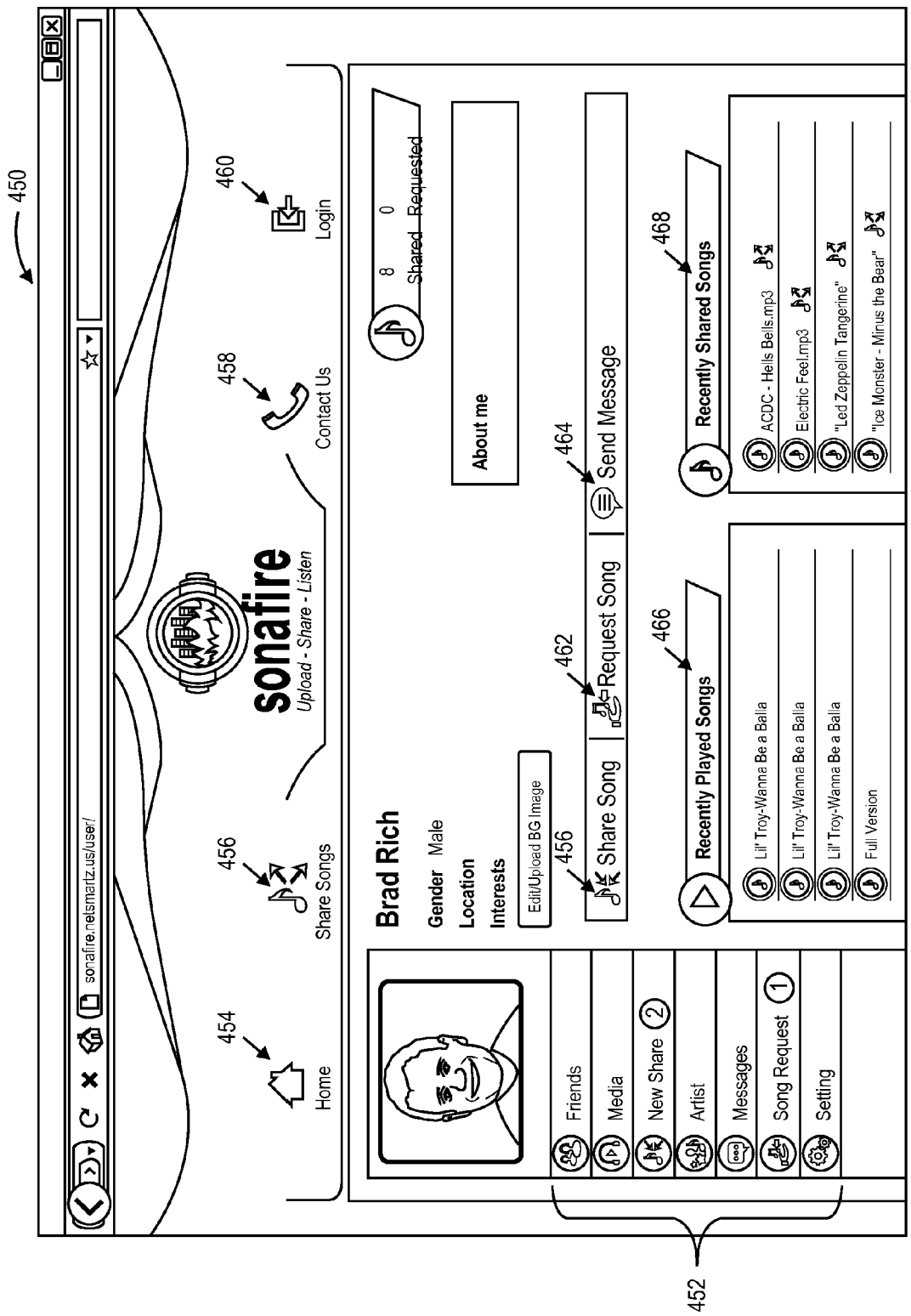
Figure 4J:
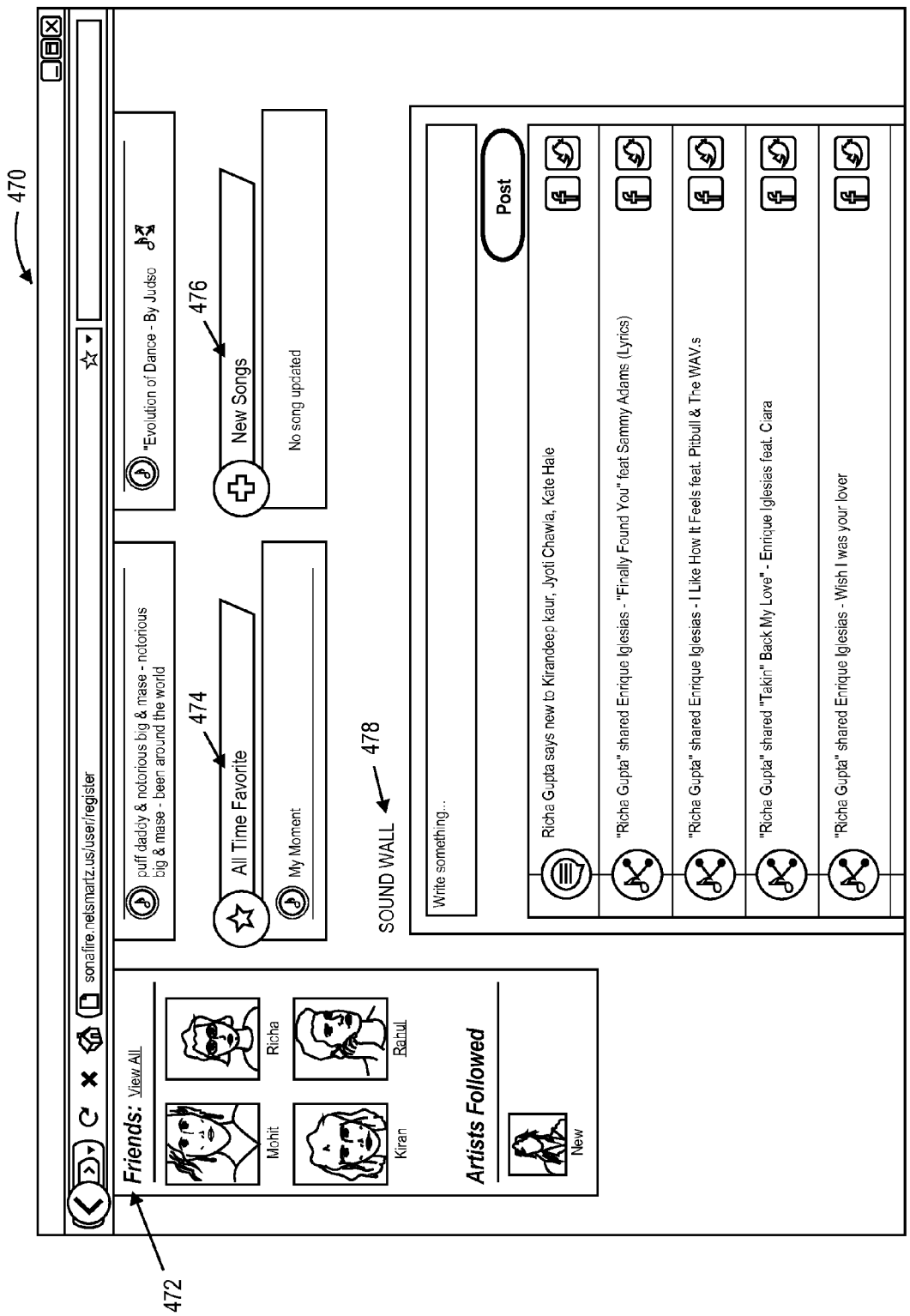

Now referring to FIG. 4I, it illustrates an embodiment of a top portion of a webpage or website 450 of a service provider (e.g., Sonafire®, the owner of media mechanism 110 of FIG. 1) to allow the user various types of information and any number of options, such the user may obtain information by simply clicking menu 452, including friends, media, new share, etc., home 454 to go to home page, share songs 456 to share songs, my account 458 to access the user account, logout 460 to logout of the account, request song 462 to request a song, send message 464 to send a message (e.g., email), recently played songs 466 to open a list of recently played songs, recently shared songs 468 to open a list of recently shared songs, etc. FIG. 4J illustrates an embodiment of a bottom portion of a service provider website/webpage 470 providing additional options, such as a list friends 472, a list of all-time favorite media content 474, new songs 476 (newly released or added songs, etc.), and a sound wall 478, etc., to have an open forum for other users/friends and to the user to post comments, etc.

It is contemplated that the aforementioned screenshots are merely provided as examples and that embodiments are not limited to any particular format, color, design, options, etc. Further, in some embodiments, users may be provided various tools and options to customize their account webpages, such as a user may limit those who can view the comments posted via the sound wall 478.

Figure 4K:
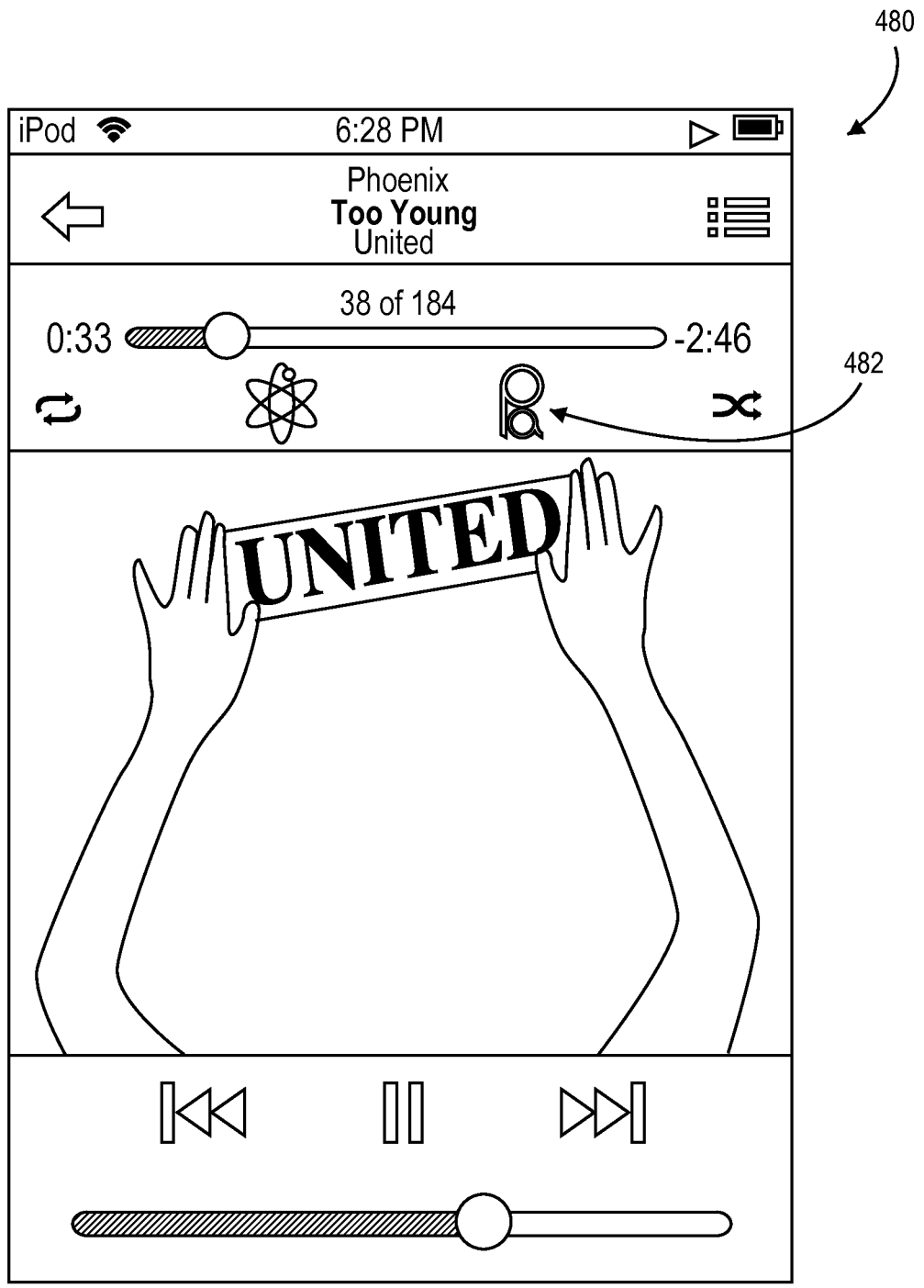
Figure 4L:
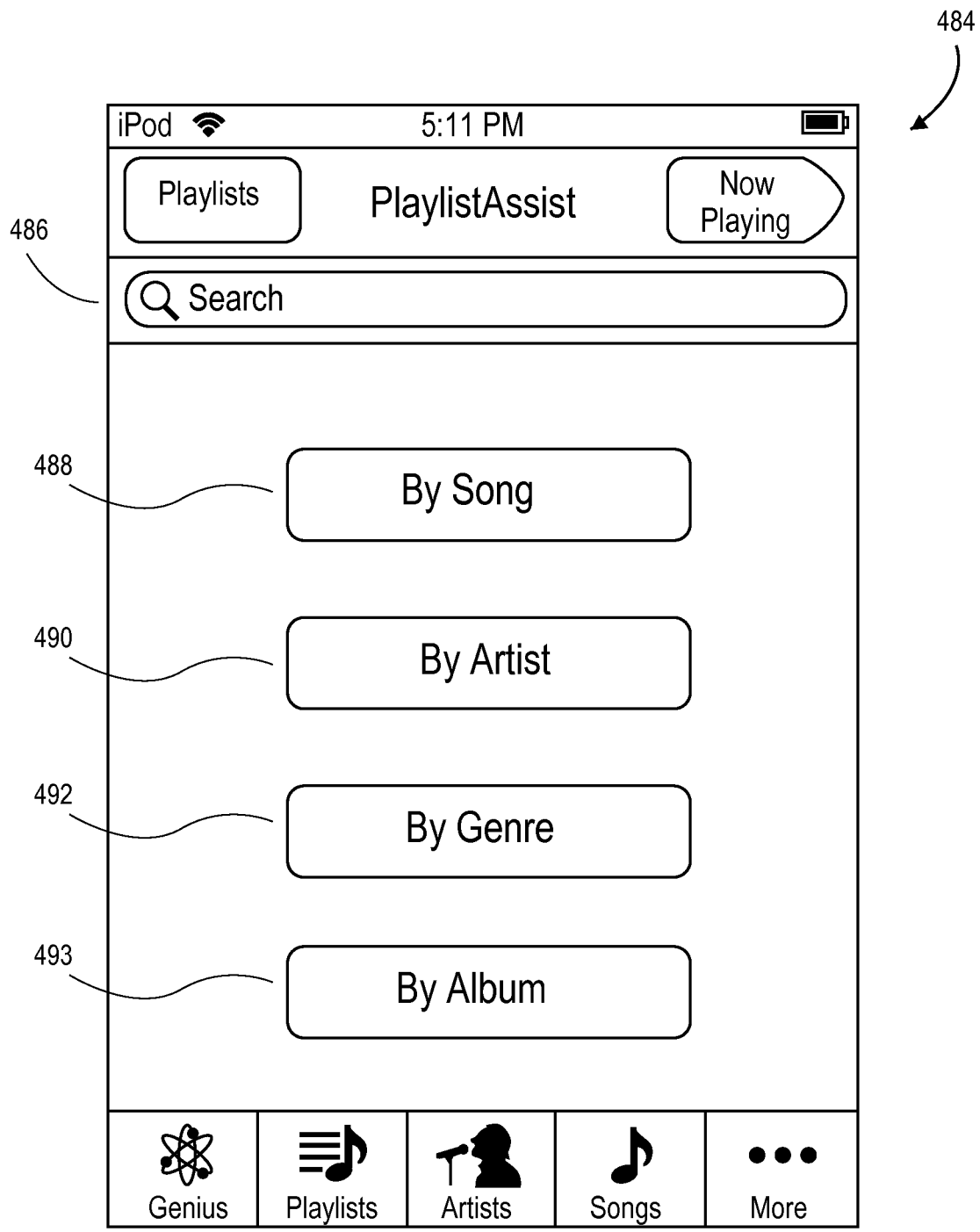

FIG. 4K illustrates a song main menu page 480 according to one embodiment. Main menu page 480 illustrates a menu that a user may use to perform certain tasks, such as play a song, by clicking on various icons, such as icon 482. FIG. 4L illustrates a playlist assist main menu page 484 according to one embodiment, where a menu is provided for the user to use the playlist assist as facilitated by media mechanism 110 of FIG. 1 to perform certain tasks, such as perform a search using search bar 486 or "by song" 488, "by artist" 490, "by genre" 492, and "by album" 493, or the like.

Figure 4M:
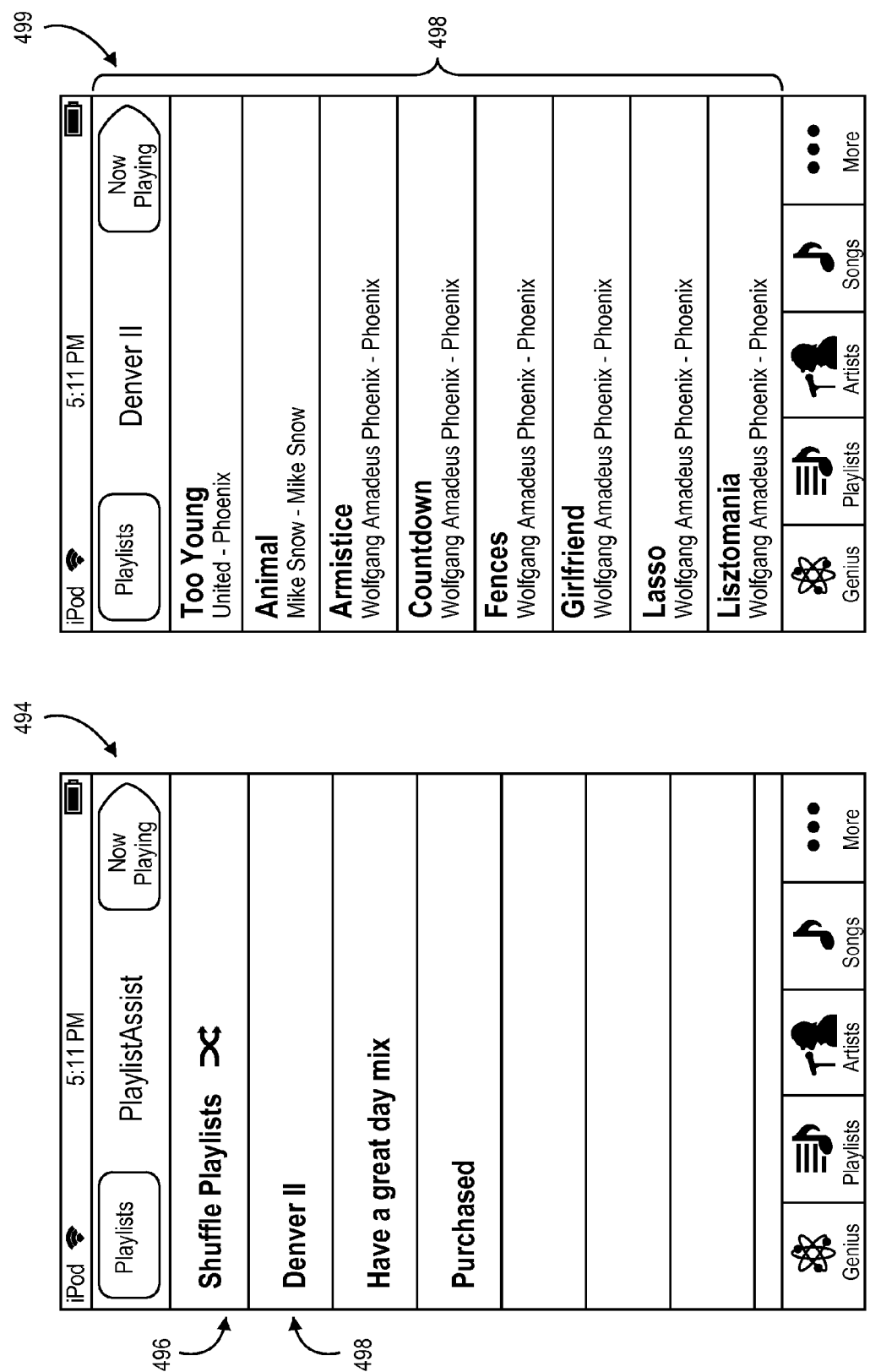

FIG. 4M illustrates screenshots of playlist assist 494 and a selection result 499 according to one embodiment. In one embodiment, as illustrated, the user may choose the "by song" option 488 of playlist assist menu 484 of FIG. 4L to select a song, such as "Too Young" as shown in playlist assist 494. Playlist assist 494 illustrates, in one embodiment, that upon selecting Too Young, playlist assist 494 shows all the playlists 496 (such as "Denver II" 498, "Have a Great Day Mix", and "Purchased") that contain the song Too Young. An option to shuffle the playlists 496 is also provided. Now, if the user selects a playlist, such as Denver II 498, and given that each of the listed playlists 496 are linked to their specific playlist screen, when the user selects Denver II 498, then all the songs (including Too Young) associated with or contained within Denver II 498 are shown on a corresponding screen 499.

Figure 6A:
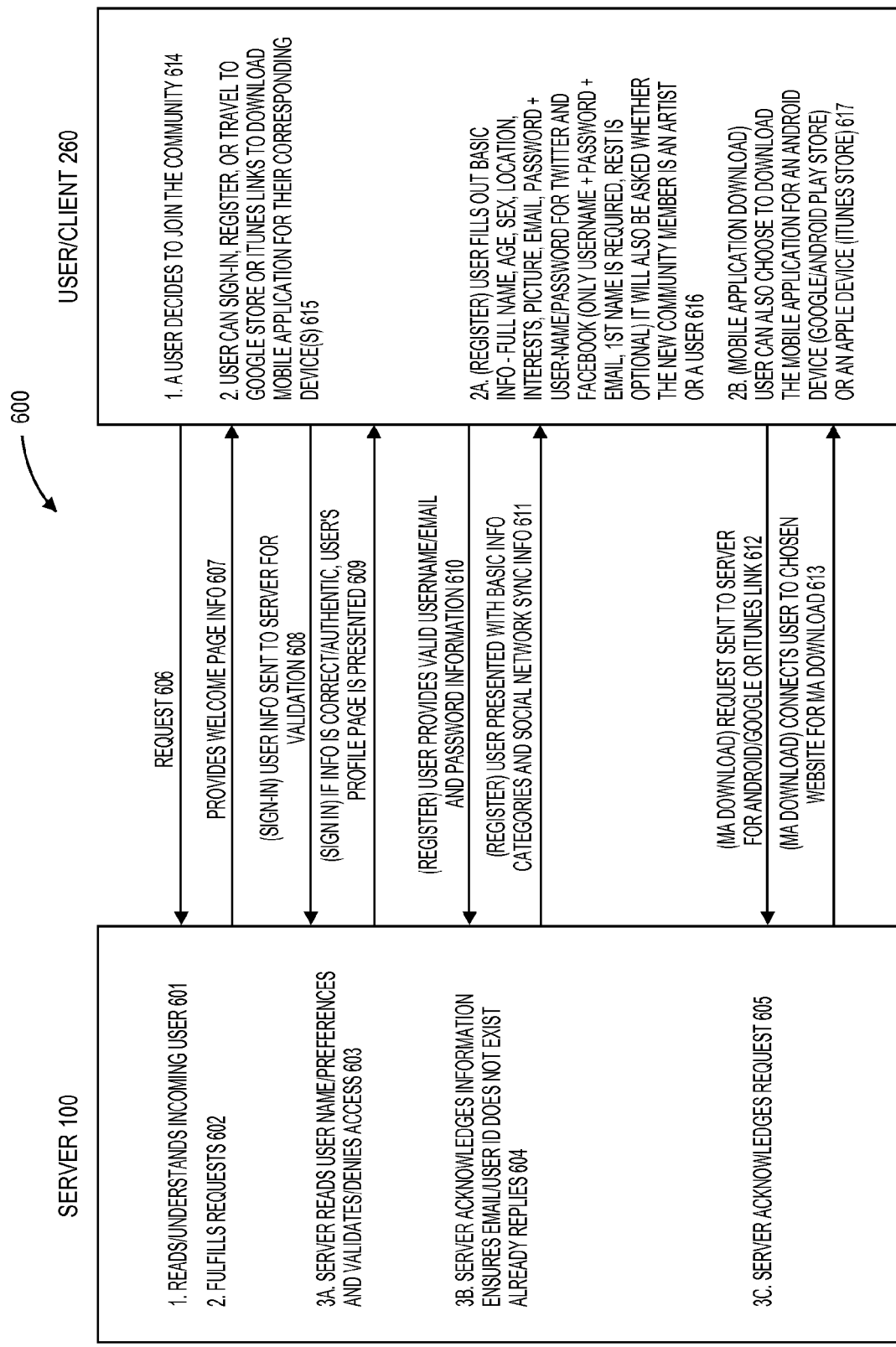

Referring now to FIG. 6A, it illustrates a transaction sequence 600 for facilitating playlist assistance and sharing of media content over multiple media communities using media mechanism 110 of FIG. 1 according to one embodiment. Transaction sequence 600 includes a transaction relating to joining a music community according to one embodiment, where server computer 100 hosts media mechanism 110 of FIG. 1. In one embodiment, a user joins a music community 614 at client computer 260 (e.g., mobile computing device, such as a smartphone, tablet computer, etc.) and subsequently places a request (such as for a song, a movie, an artist, a genre, etc.) with server computer 100 is in communication with client computer 260. The request is received 606 at server computer 100 and further, at server 100, the request is reviewed 601 and fulfilled 602. Upon login or placing the request, the user may be provided a particular response page 607, such as a welcome page. The user may use the welcome page to sign-in 615 and, if necessary, register or join through other forms, such as Google store, etc. Further, the user may fill out the form provided through the welcome page with the user's basic personal information 616, such as name, age, sex, location, etc. The user may further choose to download a software application 617 on their client computer 260.

Further, the user-inputted information is transmitted 608 over to server computer 608 for validation and if the user information is validated and determined to be correct, the user may be presented with a user profile page 609 the user's client computer 260. The user may choose to provide or enter 610 any one or more of user identification ("userID"), a user email, a password, and a passcode, etc., and the user may then be presented with additional information 611, such as basic categories, social networks, synchronization information, etc. With the downloaded mobile software application at client computer 260, the user may place and send the request 612 using the mobile software application, while server computer 100 allows the user to connect to a chosen website 613 using the downloaded application. At server computer 100, the user information is read and validated 603 and acknowledged 604 as well as the user request is acknowledged 605. It is contemplated that the downloaded mobile software application may be obtained or downloaded via any one or more manners, such as a website, an email, a pop-up window, etc. It is further contemplated that there may not be a need for a software application or that the software application may not have to be downloaded and that its various features and tools (e.g., user interface (e.g., user interface 266 of FIG. 2), menus, tool bars, etc.) may be accessed and used over a cloud network, such as network 250 of FIG. 2.

Figure 6B:
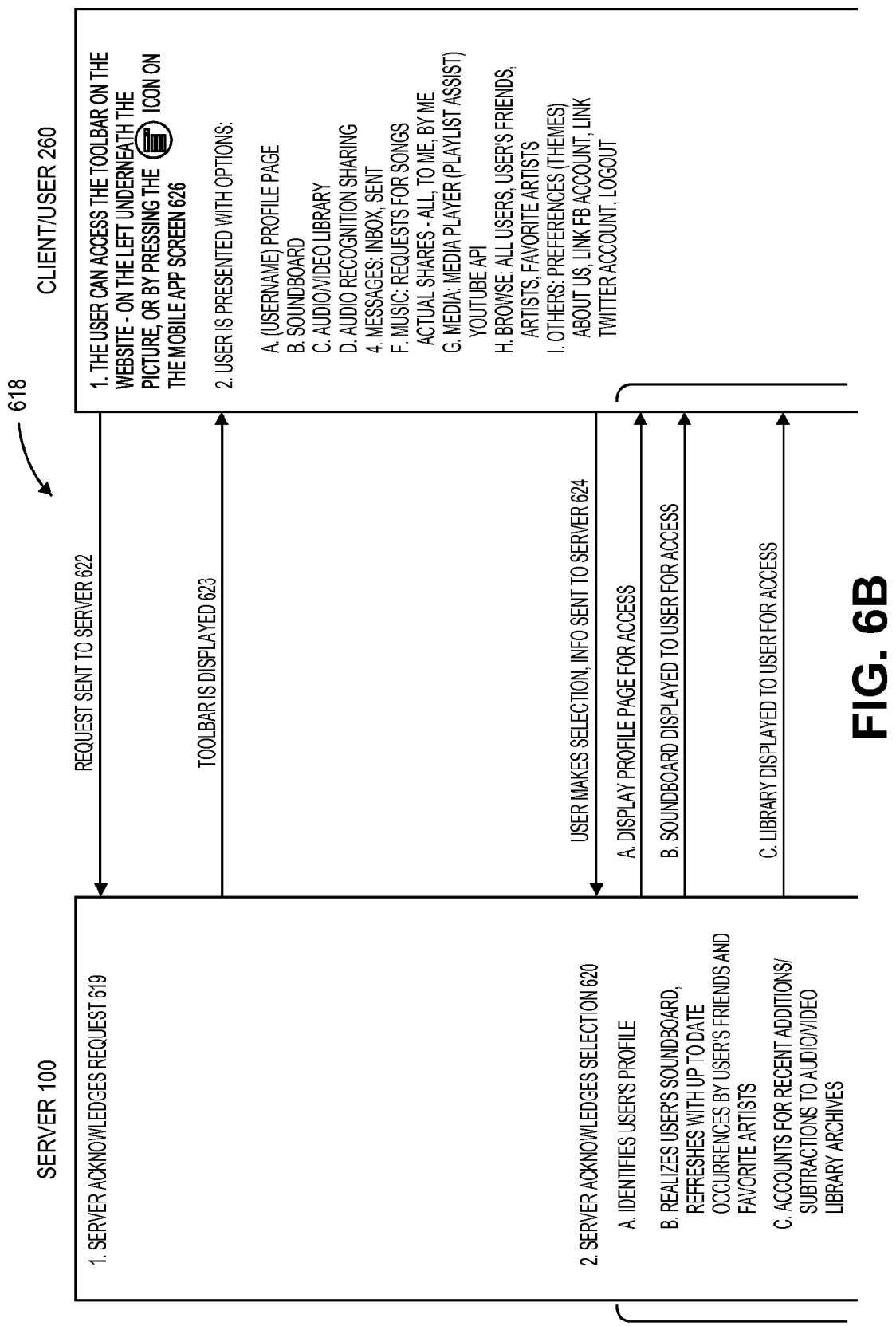

FIG. 6B illustrates a transaction sequence 618 for facilitating playlist assistance and sharing of media content over multiple media communities using media mechanism 110 of FIG. 1 according to one embodiment. Transaction sequence 600 includes a transaction relating to viewing, manipulating, and using tool/option bar according to one embodiment, where server computer 100 hosts media mechanism 110 of FIG. 1. In one embodiment, a user joins a music community 614 at client computer 260 (e.g., mobile computing device, such as a smartphone, tablet computer, etc.) and subsequently places a request (such as for a song, a movie, an artist, a genre, etc.) with server computer 100 is in communication with client computer 260. At client computer 260, a user may access a tool bar 626 provided through a user interface (e.g., user interface 266 of FIG. 2), such as via a website, to access and use any number of options 627, such as profile page, soundboard, audio/video library, etc.

In one embodiment, using the available tool bars and their options, via the user interface, the user may place a request that is then sent 622 to server computer 100. As further illustrated, one or more tool bars, as facilitated by server computer 100 having media mechanism 110 of FIG. 1, may be displayed 623 at client computer 260 and further, on the server side, the user's request is acknowledged 619. The user may be provided any number and type of selections at client computer 260, where the user makes a selection using these features and sends the relevant information 624 to server computer 100. Some of these selections and the relevant information 625 include, but are not limited to, profile page, soundboard, audio/video library, message inbox/outbox, etc. On the server side, the user selections are acknowledged 621, such as the user's profile page is identified, etc.

Figure 6C:
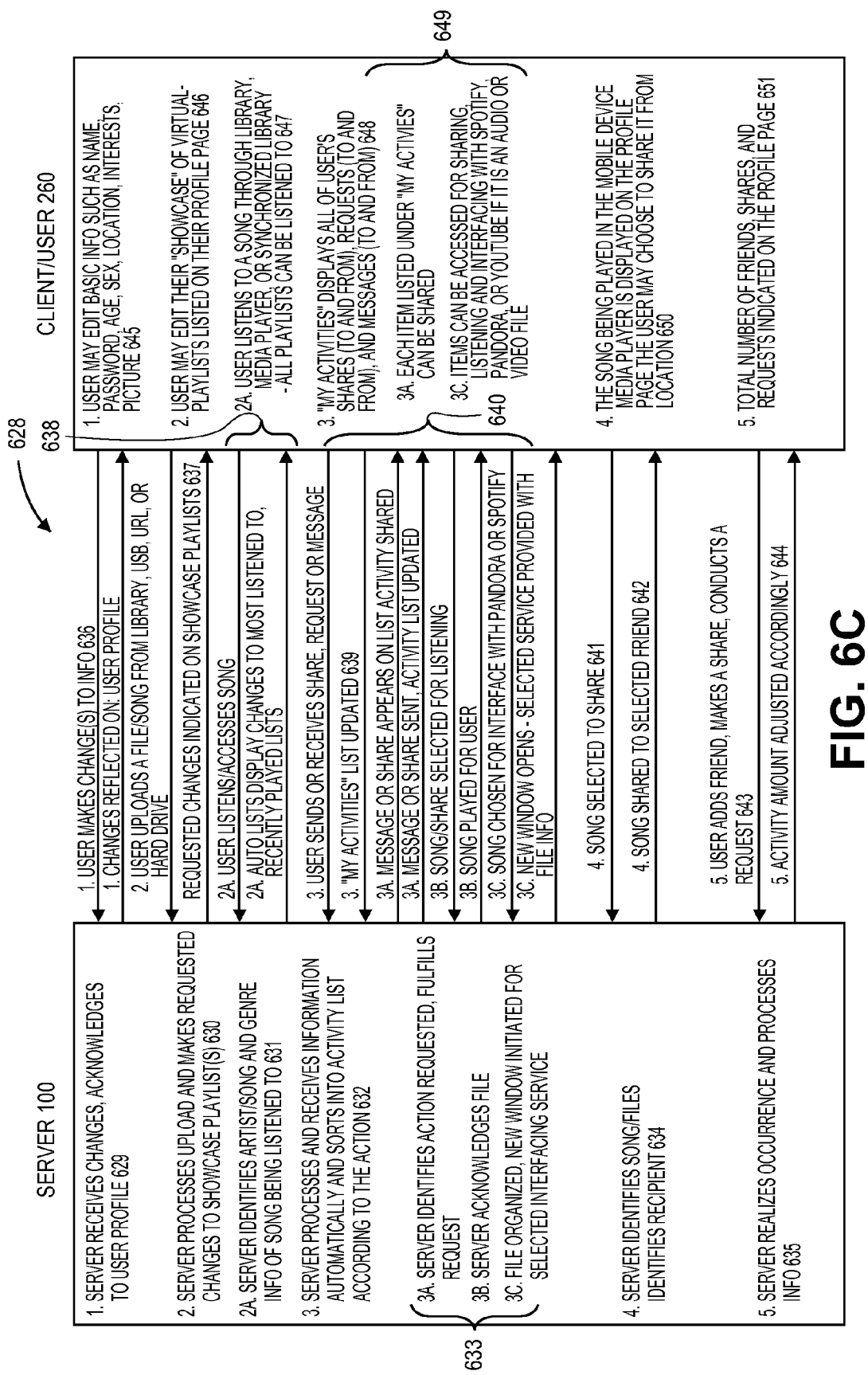

FIG. 6C illustrates a transaction sequence 628 for facilitating playlist assistance and sharing of media content over multiple media communities using media mechanism 110 of FIG. 1 according to one embodiment. Transaction sequence 628 includes a transaction relating to user profile pages as facilitated by media mechanism 110 of FIG. 1 according to one embodiment, where server computer 100 hosts media mechanism 110 of FIG. 1. As illustrated, a user, via client computer 260, may use a profile page to add, edit or delete basic information 645, such as user name, password, etc., add, edit or delete the available "showcase" of virtual playlists listed on the profile page 646, play content, such as listen to a song, watch a movie, etc., through a library using a media player (e.g., media player 262 of FIG. 2) 647, create, edit or delete "my activities" (as illustrated with reference to FIGS. 4A-4B) provided through the profile page 648, sharing various items (e.g., sharing a song via email and/or a social network website, such as Facebook®, etc.) provided through "my activities" 649, etc. Further, the user may use the profile page to display or share, etc., any media content (e.g., display a song being played by the media device) 650, and further use the profile page to allow other users (e.g., friends, family, other users, etc.) to share, request, etc., the user profile page 651.

In one embodiment, user changes are communicated from client computer 260 to server computer 100, which then reflects the changes on through the user profile 636. For example, the user uploads media content, using a media library, etc., along with any other requested changes 637 and further, the user accesses and play the requested media content (e.g., listen to a song, etc.), where the display may automatically change to the most-recently played media contents and/or playlists 638. Further, the user may continue to send, receive, share, request, message, or the like, while, in response, server computer 100 updates the relevant information, such as update the user's "my activities" 639. Some of these tasks include, but are not limited to, message or share appears on a list, activity sheet, message or share or sent an updated activity list, and the like 640. The user may select a media content file (e.g., select a song) that is communicated 641 to server computer 100, and the selected media content file is then shared with selected friends 642. On the server side, the receipt of the selected media content file is realized and identified 634. The user adds friends and makes the share, or conducts a request 643, and any activity amount is adjusted accordingly 644. On the server side, such occurrences are realized, recognized, and any relevant information is processed 635.

Further, at sever computer 100, any changes proposed by the user to the user profile, via client computer 260, are acknowledged 629 and these requested changes are processes, uploaded and shown in showcase playlists 630, such as a song, an artist, and/or a genre relating to the selected media content file (e.g., song) may be identified and listed 631.

Figure 6D:
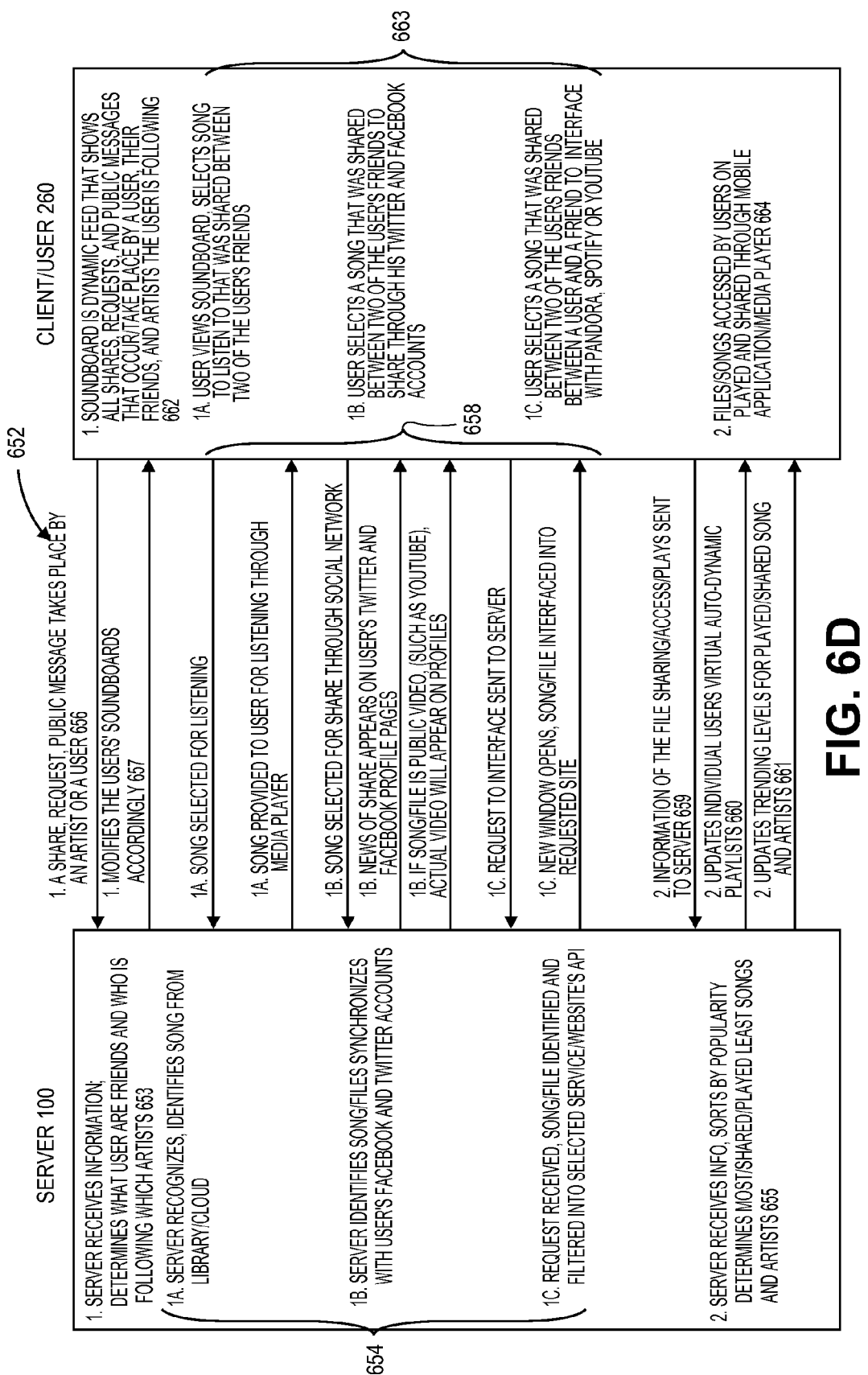

FIG. 6D illustrates a transaction sequence 652 for facilitating playlist assistance and sharing of media content over multiple media communities using media mechanism 110 of FIG. 1 according to one embodiment. Transaction sequence 652 includes a transaction relating to soundboards (as illustrated with reference to FIG. 4F) as facilitated by media mechanism 110 of FIG. 1 according to one embodiment, where server computer 100 hosts media mechanism 110 of FIG. 1. In one embodiment, at client computer 260, a soundboard is provided to serve as a dynamic feed to show various requests, shares, public messages, etc., placed by a user, the user's friends, and others 662. For example, the user may view the soundboard and select a media content (e.g., song) to play that was shared between two or more of the user's friends, such as through Twitter®, Facebook®, or other social network websites, or through interface with Pandora®, Spotify®, YouTube®, and the like 663. Further, on client side, various media content files (e.g., songs) may be access by the user via media mechanism 110 at server computer 100 to be played and shared through a media player or the like 664.

Continuing with transaction sequence 652, a share, a request, or a public message may take place 656, which is then modified by the user's soundboard 657. Transaction sequence 652 continues with various processes 658, such as selection of a media content file (e.g., selecting a song for listening, etc.) and in turn, the requested or selected media content file (e.g., song) is provided to the user to play, etc., as listed in FIG. 6D. On the server side, media mechanism 110 of FIG. 1 at server computer 100 receives the information from the user, via client computer 260 over a network (e.g., network 250 of FIG. 2) and determines what users are friends and which is simply following, for example, an artist 653. Further, on server side, additional operations 654 are performed, such as the requested media content file (e.g., song) is recognized and identified from one or more media libraries which may be available through a local database or over a cloud network, the identified media content file is synchronized with the user's various online accounts (e.g., Facebook®, etc.) and such, and the user request is received, the requested media content is identified, and filtered into a selected service website, etc.

In one embodiment, any file sharing information is accessed and sent 659 to server computer 100 where the individual user's virtual auto-dynamic playlists are updated 660, and any trending levels for played and/or shared the requested media content files, such as songs, artists, etc., are updated 661. Server computer 100 receives the information and sorts it based on various factors, such as by popularity, to determine the level of use or importance, etc., such as most/least shared, most/least played, etc., for all media content files, such as songs, movies, lectures, artists, genres, and the like 655.

FIG. 6E illustrates a transaction sequence 665 for facilitating playlist assistance and sharing of media content over multiple media communities using media mechanism 110 of FIG. 1 according to one embodiment. Transaction sequence 665 includes a transaction relating to a software application including a user interface (e.g., software application 264 including user interface 266 of FIG. 2) and built into a media player or a website at client computer 260 and as facilitated by media mechanism 110 of FIG. 1 according to one embodiment, where server computer 100 hosts media mechanism 110 of FIG. 1.

In one embodiment, a user selects, using a user interface provided by a software application at client computer 260, a type of media content (e.g., a song) for play 679 and that request is communicated 671 to server computer 100 where the request is received and the requested media content is identified, selected, and provided 666 to and then played 672 for the user using a media player at client computer 260. The user may attempt or login to access media playlists, profile page, and any other menus and tools, via a website or user interface provided through the media player 680 at client computer 260. The user attempt or login may be communicated as a request 673 to server computer 100 where the request is processed 667 and the resulting access is provided to the user 674.

At client computer 260, the user may choose to access, manipulate, and use the various menus, options, etc., provided through the software application and user interface built into the media player to perform various operations or selection options 681, such as play songs, etc. Further, the user may have an option to access and play or shuffle or show any of the displayed playlists 682, and perform any other operations relating to the media content 683, such as listen, play, pause, forward, rewind, etc., the media content (e.g., song). The selections of options as set forth in 681 is sent 675 to server computer 100 where the selection is acknowledged 668 and any relevant playlists are found and sorted according to the request 669 and then communicated back client computer 260 where they are displayed 676 in accordance with the user selection. The user may choose to perform various operations with the content media, such as play, pause, forward, etc., a song or other media content 683. A corresponding request is generated and sent 677 to server computer 100 where the appropriate playlists are received, acknowledged and processed 670 and once the request is met 678, an appropriate action is triggered, such as playing the song, at client computer 260.

Figure 5:
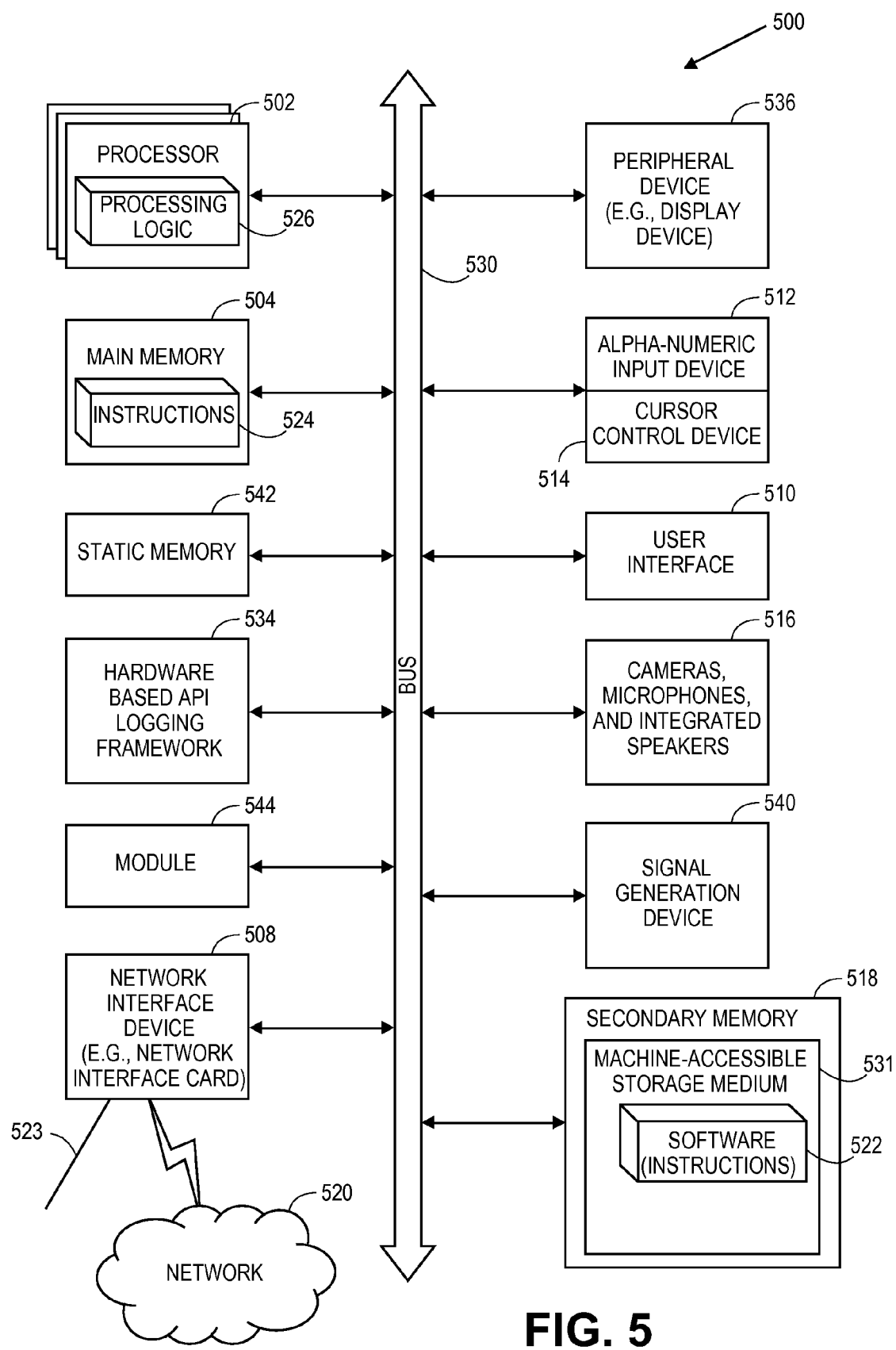
FIG. 5 illustrates a computer system according to one embodiment.

Referring now to FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 260 of FIG. 1 and FIG. 2, respectively. In alternative embodiments, the machine may be connected (e.g., networked) to other machines in a network (such as host machine 100 of FIG. 1 connected with client machine 260 over network 250 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes one or more processors 502, a main memory 504 (e.g., read-only memory (ROM), flash memory, dynamic random access memory (DRAM) such as synchronous DRAM (SDRAM) or Rambus DRAM (RDRAM), etc., static memory 542, such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes instructions 524 (such as software 522 on which is stored one or more sets of instructions 524 embodying any one or more of the methodologies or functions of mechanism 110 as described with reference to FIG. 1 and other figures described herein) which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of mechanism 110 as described with reference to FIG. 1 and other figures discussed herein.

The computer system 500 may further include a network interface device 508, such as a network interface card (NIC). The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), a signal generation device 540 (e.g., an integrated speaker), and other devices 516 like cameras, microphones, integrated speakers, etc. The computer system 500 may further include peripheral device 536 (e.g., wireless or wired communication devices, memory devices, storage devices, audio processing devices, video processing devices, display devices, etc.). The computer system 500 may further include a hardware-based application programming interface logging framework 534 capable of executing incoming requests for services and emitting execution data responsive to the fulfillment of such incoming requests.

Network interface device 508 may also include, for example, a wired network interface to communicate with remote devices via network cable 523, which may be, for example, an Ethernet cable, a coaxial cable, a fiber optic cable, a serial cable, a parallel cable, etc. Network interface device 508 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface device 508 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

The secondary memory 518 may include a machine-readable storage medium (or more specifically a machine-accessible storage medium) 531 on which is stored one or more sets of instructions (e.g., software 522) embodying any one or more of the methodologies or functions of mechanism 110 as described with reference to FIG. 1 and other figures described herein. The software 522 may also reside, completely or at least partially, within the main memory 504, such as instructions 524, and/or within the processor 502 during execution thereof by the computer system 500, the main memory 504 and the processor 502 also constituting machine-readable storage media. The software 522 may further be transmitted or received over a network 520 via the network interface card 508. Network 520 may be the same as network 250 of FIG. 2. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

Modules 544 relating to and/or include components and other features described herein (for example in relation to media mechanism 110 of FIG. 1) can be implemented as discrete hardware components or integrated in the functionality of hardware components such as ASICs, FPGAs, DSPs or similar devices. In addition, modules 544 can be implemented as firmware or functional circuitry within hardware devices. Further, modules 544 can be implemented in any combination hardware devices and software components.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: receiving, at a first computing device, a request relating to media content, wherein the request is placed by a user at a second computing device; researching a plurality of media playlists at a plurality of media communities for the media content; selecting one or more of the plurality of media playlists at one or more of the media communities having the media content; and transmitting, from the first computing to the second computing device, the one or more media playlists having the media content.

Embodiments or examples include any of the above methods further comprising evaluating the request to determine its content including the media content or user preference relating to sorting the selected one or more media playlists.

Embodiments or examples include any of the above methods further comprising sorting the selected one or more media playlists according to the user preference.

Embodiments or examples include any of the above methods further comprising sharing the media content and other media content of the one or more media playlists with one or more users using one or more of the plurality of media communities over a network, wherein sharing is performed using one or more of emailing, texting, and posting at one or more of a website, a network website, and a music community website.

Embodiments or examples include any of the above methods further comprising displaying the one or more media playlist using a display device coupled to the second computing device, and playing the media content and other media content of the one or more media playlists using a media player of the second computing device.

Embodiments or examples include any of the above methods wherein the request is placed via a user interface that is provided by a software application at the second computing device, the software application comprising one or more of the media player, a media community website, and a social networking website, wherein the second computing device includes a client computing device coupled to the first computing device over the network.

Embodiments or examples include any of the above methods wherein the network comprises one or more of a cloud-based network, a Local Area Network (LAN), a Wide Area Network (WAN), a Metropolitan Area Network (MAN), a Personal Area Network (PAN), an intranet, an extranet, or the Internet.

Another embodiment or example includes and apparatus to perform any of the methods mentioned above.

In another embodiment or example, an apparatus comprises means for performing any of the methods mentioned above.

In yet another embodiment or example, at least one machine-readable storage medium comprising a plurality of instructions that in response to being executed on a computing device, causes the computing device to carry out a method according to any of the methods mentioned above.

In yet another embodiment or example, at least one non-transitory or tangible machine-readable storage medium comprising a plurality of instructions that in response to being executed on a computing device, causes the computing device to carry out a method according to any of the methods mentioned above.

In yet another embodiment or example, a computing device arranged to perform a method according to any of the methods mentioned above.

Some embodiments pertain to a system comprising: a computing device having a memory to store instructions, and a processing device to execute the instructions, the computing device further having a mechanism to: receive, at a first computing device, a request relating to media content, wherein the request is placed by a user at a second computing device; research a plurality of media playlists at a plurality of media communities for the media content; select one or more of the plurality of media playlists at one or more of the media communities having the media content; and transmit, from the first computing to the second computing device, the one or more media playlists having the media content.

Embodiments or examples include any of the above system wherein the mechanism is further to evaluate the request to determine its content including the media content or user preference relating to sorting the selected one or more media playlists.

Embodiments or examples include any of the above system wherein the mechanism is further to sort the selected one or more media playlists according to the user preference.

Embodiments or examples include any of the above system wherein the mechanism is further to share the media content and other media content of the one or more media playlists with one or more users using one or more of the plurality of media communities over a network, wherein sharing is performed using one or more of emailing, texting, and posting at one or more of a website, a network website, and a music community website.

Embodiments or examples include any of the above system wherein the mechanism is further to display the one or more media playlist using a display device coupled to the second computing device, and playing the media content and other media content of the one or more media playlists using a media player of the second computing device.

Embodiments or examples include any of the above system wherein the request is placed via a user interface that is provided by a software application at the second computing device, the software application comprising one or more of the media player, a media community website, and a social networking website, wherein the second computing device includes a client computing device coupled to the first computing device over the network.

Another embodiment or example of the functionality included is audio recognition-based sharing. This allows the user to activate software that will recognize any particular song/file/movie being listened to through a third party/external speaker/listening device/anything that produces audible sound or vibrations. Without needing to permanently download that particular file, the audio recognition-based mechanism checks the audio/video file Library, various cloud audio/video/media providers, and assorted third party partner websites, etc., for that particular song. Once the media content file (e.g., song, etc.) is realized, the user is presented with options to play the media content file (e.g., listen to the song) via the media player on the device, share that particular file, share the news of the user listening to it, purchase the file from any particular vendor (iTunes, etc.), and/or interface that particular file with third-party websites (Spotify, Pandora, etc.).

An embodiment of the service is to provide an interface, function, and/or news feed that dynamically indicates what files, such as songs, other audios, movies, other videos, albums, genres, etc., are being accessed, shared, viewed, played, etc., the most and the least at the moment that particular aspect (e.g., "list", such as a sub-playlist) is being viewed. If a user makes an action and/or an occurrence of an event happens in any category, the list may automatically update, change, sort, group, etc., to indicate which content media files are being accessed, shared, viewed, played, etc., the most number of times and the least number of times. This provides the user with an up-to-date and current list for viewing while accessing the high traffic, trending, and/or low traffic files in a separate list according to the amount of times the users on a particular website/media community or any website/media community have accessed, shared, viewed, played, etc., each individual media content file, such as song, other audio, movies, other video, album, genre, etc.

Embodiments or examples include any of the above system wherein the network comprises one or more of a cloud-based network, a Local Area Network (LAN), a Wide Area Network (WAN), a Metropolitan Area Network (MAN), a Personal Area Network (PAN), an intranet, an extranet, or the Internet.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
    receiving, via a data processing device, a request relating to media content, wherein the request is placed by a user, wherein the request includes dynamically altering one or more queries that are dynamically and automatically altered based on changes in criteria set forth by the user, wherein the changes in the criteria are triggered by one or more changes in at least one of user preferences, user activities, user selections, user options, and user playlists, and wherein the changing criteria is further triggered by changing music trends, wherein the changing music trends to dynamically alter the user's auto-dynamic playlists, and wherein the one or more queries include sorting or shuffling of the media content, playing or pausing or stopping of the media content, adding one or more new criterion to the criteria, deleting or revising one or more existing criterion of the criteria, adding one or more new categories to the media content, deleting or updating of one or more existing categories relating of the media content, and changing relevance of the media content;
    searching, via the data processing device, a plurality of media playlists at a plurality of media communities for the media content, wherein the plurality of media playlists includes the auto-dynamic playlists;
    identifying, via the data processing device, one or more of the plurality of media playlists at one or more of the media communities having the media content;
    selecting, via the data processing device, the media content from the one or more of the plurality of media playlists, wherein selecting is dynamically performed while the media content is being played and in accordance with the altering queries;
    transmitting, via the data processing device and based on the one or more queries of the request, results including one or more of the media content, the one or more media playlists, and the one or more of the media communities;
    evaluating, via the data processing device, the request to determine its content including the media content or user preference relating to sorting the selected one or more media playlists
        wherein the categories include one or more of media type or name, artist type or name, album type or name, and genre type or name, and wherein the relevance includes popularity of the media content, wherein the relevance changes when the popularity of the media content trends up or trends down, and wherein transmitting further includes providing one or more gates to the one or more media playlists, one or more links of the one or more media communities, and a soundboard to serve as a dynamic feed offering a set of data relating to the user or one or more associates of the user, wherein the set of data includes at least one of requests, shares, public messages, and posts, wherein the one or more associates include one or more of the user's family, the user's friends, and the user's further comprising sorting, via the data processing device, the selected one or more media playlists according to the user preference, wherein searching further comprises detecting, via the processing device, the media content being played on a third-party media device, wherein detecting includes checking into, over a network, media files or libraries associated with the third-party media device; and displaying, via the data processing device, at least one of the media content, the one or more media playlist, the one or more of the media communities, one or more gates to the one or more media playlists, and one or more links of the one or more media communities; and playing, via the data processing device, the media content.

2. The method of claim 1, further comprising sharing, via the data processing device, the media content and other media content of the one or more media playlists with one or more users using one or more of the plurality of media communities over the network, wherein sharing is performed using one or more of emailing, texting, and posting at one or more of a website, a network website, and a music community website, wherein the media communities include at least one of media-specific websites, media stores, media players, business networking websites, and social network websites.

3. The method of claim 1, wherein the request is placed at the data processing device via a user interface that is provided by a software application, the software application comprising one or more of the media player, a media community website, and a social networking website.

4. The method of claim 3, wherein the data processing device to host a media player, wherein the data processing device comprises a computing device including one or more of a server computer, a desktop computer, a mobile computer including at least one of a laptop computer, a table computer, a smartphone, a smartwatch, a smartcard, and a wearable computer including at least one of a pair of wearable glasses, a jewelry item, and a clothing item, wherein the network comprises one or more of a cloud-based network, a Local Area Network (LAN), a Wide Area Network (WAN), a Metropolitan Area Network (MAN), a Personal Area Network (PAN), an intranet, an extranet, a proximity network, a Bluetooth network, and the Internet.

5. A system comprising:

a computing device having a memory to store instructions, and a processing device to execute the instructions to facilitate a mechanism to:

receive a request relating to media content, wherein the request is placed by a user, wherein the request includes one or more queries that are dynamically and automatically altered based on changes in criteria set forth by the user, wherein the changes in the criteria are triggered by one or more changes in at least one of user preferences, user activities, user selections, user options, and user playlists, and wherein the changing criteria is further triggered by changing music trends, wherein the changing music trends to dynamically alter the user's auto-dynamic playlists, wherein the one or more queries include sorting or shuffling of the media content, playing or pausing or stopping of the media content, adding one or more new criterion to the criteria, deleting or revising one or more existing criterion of the criteria, adding one or more new categories to the media content, deleting or updating of one or more existing categories relating of the media content, and changing relevance of the media content;

search a plurality of media playlists at a plurality of media communities for the media content;

identify one or more of the plurality of media playlists at one or more of the media communities having the media content, wherein the plurality of media playlists include the auto-dynamic playlists;

select the media content from the one or more of the plurality of media playlists, wherein selecting is dynamically performed while the media content is being played and in accordance with the altering queries; and transmit, based on the one or more queries of the request, results including one or more of the media content, the one or more media playlists, and the one or more of the media communities;

wherein the mechanism is further to evaluate the request to determine its content including the media content or user preference relating to sorting the selected one or more media playlists, wherein the categories include one or more of media type or name, artist type or name, album type or name, and genre type or name, and wherein the relevance includes popularity of the media content, wherein the relevance changes when the popularity of the media content trends up or trends down, wherein transmitting further includes providing one or more gates to the one or more media playlists, one or more links of the one or more media communities, and a soundboard to serve as a dynamic feed offering a set of data relating to the user or one or more associates of the user, wherein the set of data includes at least one of requests, shares, public messages, and posts, wherein the one or more associates include one or more of the user's family, the user's friends, and the user's colleagues;

wherein the mechanism is further to sort the selected one or more media playlists according to the user preference, wherein searching further comprises detecting the media content being played on a third-party media device, wherein detecting includes checking into, over a network, media files or libraries associated with the third-party media device, and wherein the mechanism is further to: display at least one of the media content, the one or more media playlist, the one or more of the media communities, one or more gates to the one or more media playlists, and one or more links of the one or more media communities; and playing the media content.

6. The system of claim 5, wherein the mechanism is further to share the media content and other media content of the one or more media playlists with one or more users using one or more of the plurality of media communities over the network, wherein sharing is performed using one or more of emailing, texting, and posting at one or more of a website, a network website, and a music community website, wherein the media communities include at least one of media-specific websites, media stores, media players, business networking websites, and social network websites.

7. The system of claim 5, wherein the request is placed via a user interface that is provided by a software application, the software application comprising one or more of the media player, a media community website, and a social networking website.

8. The system of claim 7, wherein the data processing device to host a media player, wherein the data processing device comprises a computing device including one or more of a server computer, a desktop computer, a mobile computer including at least one of a laptop computer, a table computer, a smartphone, a smartwatch, a smartcard, and a wearable computer including at least one of a pair of wearable glasses, a jewelry item, and a clothing item, wherein the network comprises one or more of a cloud-based network, a Local Area Network (LAN), a Wide Area Network (WAN), a Metropolitan Area Network (MAN), a Personal Area Network (PAN), an intranet, an extranet, a proximity network, a Bluetooth network, and the Internet.

9. At least one non-transitory machine-readable medium comprising a plurality of instructions that in response to being executed on a computing device, causes the computing device to carry out one or more operations comprising:
receiving a request relating to media content, wherein the request is placed by a user, wherein the request includes one or more queries that are dynamically and automatically altered based on changes in criteria set forth by the user, wherein the changes in the criteria are triggered by one or more changes in at least one of user preferences, user activities, user selections, user options, and user playlists, and wherein the changing criteria is further triggered by changing music trends, wherein the changing music trends to dynamically alter the user's auto-dynamic playlists, and wherein the one or more queries include sorting or shuffling of the media content, playing or pausing or stopping of the media content, adding one or more new criterion to the criteria, deleting or revising one or more existing criterion of the criteria, adding one or more new categories to the media content, deleting or updating of one or more existing categories relating of the media content, and changing relevance of the media content;
searching a plurality of media playlists at a plurality of media communities for the media content;
identifying one or more of the plurality of media playlists at one or more of the media communities having the media content, wherein the plurality of media playlists include the auto-dynamic playlists;
selecting the media content from the one or more of the plurality of media playlists, wherein selecting is dynamically performed while the media content is being played and in accordance with the altering queries; and
transmitting, based on the one or more queries of the request, results including one or more of the media content, the one or more media playlists, and the one or more of the media communities
wherein the one or more operations further comprise evaluating the request to determine its content including the media content or user preference relating to sorting the selected one or more media playlists, wherein the categories include one or more of media type or name, artist type or name, album type or name, and genre type or name, and wherein the relevance includes popularity of the media content, wherein the relevance changes when the popularity of the media content trends up or trends down,
wherein transmitting further includes providing one or more gates to the one or more media playlists, one or more links of the one or more media communities, and a soundboard to serve as a dynamic feed offering a set of data relating to the user or one or more associates of the user, wherein the set of data includes at least one of requests, shares, public messages, and posts, wherein the one or more associates include one or more of the user's family, the user's friends, and the user's colleagues;
wherein the one or more operations further comprise sorting the selected one or more media playlists according to the user preference, wherein searching further comprises detecting the media content being played on a third-party media device,
wherein detecting includes checking into, over a network, media files or libraries associated with the third-party media device; and
wherein the one or more operations further comprise: displaying at least one of the media content, the one or more media playlist, the one or more of the media communities, one or more gates to the one or more media playlists, and one or more links of the one or more media communities; and playing the media content.

10. The non-transitory machine-readable medium of claim 9, wherein the one or more operations further comprise sharing the media content and other media content of the one or more media playlists with one or more users using one or more of the plurality of media communities over the network, wherein sharing is performed using one or more of emailing, texting, and posting at one or more of a website, a network website, and a music community website, wherein the media communities include at least one of media-specific websites, media stores, media players, business networking websites, and social network websites.

11. The non-transitory machine-readable medium of claim 9, wherein the request is placed via a user interface that is provided by a software application, the software application comprising one or more of the media player, a media community website, and a social networking website, wherein the data processing device to host a media player, wherein the data processing device comprises a computing device including one or more of a server computer, a desktop computer, a mobile computer including at least one of a laptop computer, a table computer, a smartphone, a smartwatch, a smartcard, and a wearable computer including at least one of a pair of wearable glasses, a jewelry item, and a clothing item, wherein the network comprises one or more of a cloud-based network, a Local Area Network (LAN), a Wide Area Network (WAN), a Metropolitan Area Network (MAN), a Personal Area Network (PAN), an intranet, an extranet, a proximity network, a Bluetooth network, and the Internet.

* * * * *